US012766684B2

(12) United States Patent
Klein et al.

(10) Patent No.: US 12,766,684 B2
(45) Date of Patent: Oct. 20, 2026

(54) LIFTER MAIN DRIVE SUBASSEMBLY FOR A FASTENER DRIVING TOOL

(71) Applicant: Kyocera Senco Industrial Tools, Inc., Cincinnati, OH (US)

(72) Inventors: Christopher D. Klein, Cincinnati, OH (US); Ryan W.R. McGhee, Cincinnati, OH (US)

(73) Assignee: Kyocera Senco Industrial Tools, Inc., Cincinnati, OH (US)

( * ) Notice: Subject to any disclaimer, the term of this patent is extended or adjusted under 35 U.S.C. 154(b) by 0 days.

(21) Appl. No.: 19/343,022

(22) Filed: Sep. 29, 2025

(65) Prior Publication Data

US 2026/0091475 A1 Apr. 2, 2026

Related U.S. Application Data

(60) Provisional application No. 63/763,600, filed on Feb. 26, 2025, provisional application No. 63/701,075, filed on Sep. 30, 2024.

(51) Int. Cl.
*B25C 1/04* (2006.01)
*B25C 1/06* (2006.01)

(52) U.S. Cl.
CPC ................ *B25C 1/047* (2013.01); *B25C 1/06* (2013.01)

(58) Field of Classification Search
CPC .................................. B25C 1/047; B25C 1/06
See application file for complete search history.

(56) References Cited

U.S. PATENT DOCUMENTS

| | | | | |
|---|---|---|---|---|
| 3,150,488 | A | 9/1964 | Haley | |
| 4,215,808 | A | 8/1980 | Sollberger et al. | |
| 5,720,423 | A | 2/1998 | Kondo et al. | |
| 8,011,441 | B2 | 9/2011 | Leimbach | |
| 8,011,547 | B2 | 9/2011 | Leimbach | |
| 11,571,794 | B2 * | 2/2023 | Bierdeman | B25C 1/06 |
| 11,648,653 | B2 * | 5/2023 | Baba | B25C 1/047 227/10 |
| 12,083,659 | B2 * | 9/2024 | Bierdeman | B25C 1/047 |
| 2006/0180631 | A1 | 8/2006 | Pedicini | |
| 2008/0190986 | A1 * | 8/2008 | Chang | B25C 1/06 227/107 |
| 2008/0190988 | A1 | 8/2008 | Pedicini | |
| 2009/0090762 | A1 * | 4/2009 | Leimbach | B25C 5/13 227/136 |
| 2011/0198381 | A1 * | 8/2011 | McCardle | B25C 1/06 227/8 |

(Continued)

OTHER PUBLICATIONS

ISA Int'l Search Report, issued Nov. 26, 2025, 23 pgs.
Informal Comments in response to ISA Int'l Search Report, submitted Jan. 22, 2026, 3 pgs.

*Primary Examiner* — Lucas E. A. Palmer
(74) *Attorney, Agent, or Firm* — Frederick H. Gribbell; Russell F. Gribbell; William E. Crouse

(57) ABSTRACT

A lifter main drive subassembly for a fastener driving tool includes at least one motor, a common lifter/motor shaft that feeds a compact gearbox, a strain-wave gearbox that outputs to a lifter with protrusions that engage a driver during a lifting stroke. The common lifter/motor shaft is generally transverse to the longitudinal axis of movement of the driver. The rotational axis if the common lifter/motor shaft is generally co-linear with the axis of rotation of the lifter with protrusions.

9 Claims, 29 Drawing Sheets

(56) References Cited

U.S. PATENT DOCUMENTS

| | | | | |
|---|---|---|---|---|
| 2015/0352702 | A1* | 12/2015 | Chien | B25C 1/047<br>227/130 |
| 2016/0229043 | A1* | 8/2016 | Wyler | B25C 1/047 |
| 2016/0288305 | A1* | 10/2016 | McCardle | B25C 1/06 |
| 2018/0126527 | A1* | 5/2018 | Pomeroy | B25C 1/047 |
| 2018/0126528 | A1* | 5/2018 | Pomeroy | B25C 5/13 |
| 2018/0126530 | A1* | 5/2018 | Pomeroy | B25C 1/047 |
| 2019/0126452 | A1* | 5/2019 | Po | B25C 1/047 |
| 2019/0314968 | A1* | 10/2019 | Bailey | B25C 1/047 |
| 2019/0321955 | A1* | 10/2019 | Carrier | B25C 1/047 |
| 2019/0375084 | A1* | 12/2019 | Bierdeman | B25C 1/047 |
| 2020/0114500 | A1* | 4/2020 | Bierdeman | B25C 1/04 |
| 2020/0130157 | A1* | 4/2020 | Rux | B25C 1/06 |
| 2020/0164498 | A1* | 5/2020 | Wechselberger | B25C 1/047 |
| 2021/0138623 | A1* | 5/2021 | Bierdeman | B25C 1/06 |
| 2023/0311285 | A1 | 10/2023 | Rux | |
| 2024/0139923 | A1 | 5/2024 | Leimbach | |
| 2024/0316736 | A1* | 9/2024 | Harrington | B25C 1/005 |
| 2025/0214214 | A1* | 7/2025 | Mokha | B25C 1/06 |
| 2025/0229395 | A1* | 7/2025 | Broda | B25C 1/005 |
| 2025/0229396 | A1* | 7/2025 | Wechselberger | B25C 1/047 |
| 2025/0289107 | A1* | 9/2025 | Leathrum | B25C 5/13 |
| 2026/0070202 | A1* | 3/2026 | Mokha | B25C 1/008 |

* cited by examiner

LIFTER MAIN DRIVE SUBASSEMBLY FOR A FASTENER DRIVING TOOL

CROSS-REFERENCE TO RELATED APPLICATIONS

The present application claims priority to provisional patent application Ser. No. 63/701,075, titled "LIFTER MAIN DRIVER SUBASSEMBLY FOR A FASTENER DRIVING TOOL," filed on Sep. 30, 2024; and claims priority to provisional patent application Ser. No. 63/763, 600, titled "LIFTER MAIN DRIVER SUBASSEMBLY FOR A FASTENER DRIVING TOOL," filed on Feb. 26, 2025.

TECHNICAL FIELD

The technology disclosed herein relates generally to fastener driving tools and is particularly directed to portable fastener driving tools of the type which use pressurized gas to drive a piston that has a driver attached thereto, and which use a mechanical lifter to move the driver/piston back up toward a "ready position". Embodiments are specifically disclosed as having at least one motor that drives a compact gearbox to reduce the rotational speed at its output, which then drives the mechanical lifter.

In a first embodiment, there are two small motors, one on each side of the gearbox, and an elongated "gearbox input shaft" that extends from the first motor, through the gearbox, and further extends through the second motor. In other words, this gearbox input shaft is a single-piece shaft that rotates when both motors are energized. There are two portions of this elongated shaft that are driven by the motors, and act as the mechanical outputs of those motors. And the portion of this elongated shaft that extends through the gearbox acts as the input shaft of the gearbox.

The gearbox of this first embodiment is a strain-wave gearbox, which is a very compact design. The gearbox input shaft engages an oval rotor, which is the wave generator (and input) of this strain-wave gearbox. A circular spline and a flex-spline create the desired gear ratio reduction, and the flex-spline is fastened to a gearbox output shaft. That gearbox output shaft is fastened to a rotatable lifter that has a lifter rotor with multiple protrusions that mechanically interact with extensions on a driver when it is time to 'lift' that driver toward a "Ready Position."

The driver is connected to a piston, which reciprocates inside a working cylinder that includes a cylindrical sleeve. In this type of fastener driving tool, a storage chamber, that typically is in fluidic communication with the working cylinder, holds a pressurized gas that is used to force the piston (and driver) 'down' through a driving stroke, when it is time to drive a fastener (such as a nail) from the tool. This pressurized gas is not exhausted to atmosphere, but is instead retained in the displacement volume 'above' the piston, and also in the storage chamber. Therefore, the lifting stroke to return the driver/piston must 'lift' against some significant gas pressure, and thus the lifter itself must be a robust mechanism.

In this first embodiment, the two motors, the gearbox, and the lifter essentially rotate along a single axis of rotation—i.e., along the centerline of the gearbox input shaft. While that single axis of rotation is not a strict requirement for this type of design, it does lend itself well to creating a very compact overall design for this portion of the fastener driving tool. As an alternative, a different type of gearbox could be used, such as a cycloidal gearbox or a planetary gearbox. As another alternative, the output shaft of the gearbox could be geared to mesh with a second, mating gear that provides the final drive for the lifter itself, which may have a different rotational axis.

Other embodiments may use a single motor to drive a gearbox or a geartrain, and other embodiments may have a different configuration in the position of the gearbox, but most embodiments have a centrally-located gearbox that fits within an open space within a lifter rotor, to create a very compact arrangement of mechanical parts for this lifter main drive subassembly.

STATEMENT REGARDING FEDERALLY SPONSORED RESEARCH OR DEVELOPMENT

None.

BACKGROUND

Pneumatic Fastener Driving Tools

Fastener driving tools are available in many different configurations, but there are certain main 'types' of such tools. One major type, commonly used, is a pneumatic tool that uses compressed air as its main power source to drive a fastener, such as a nail or a staple, into a target workpiece, such as wood, or metal framing. In general, compressed air tools require an air hose that runs from an air compressor to the pneumatic tool, and the 'shot' of compressed air is discharged to atmosphere after every driving event.

These pneumatic tools generally use a piston that reciprocates within a working cylinder. To drive a nail, for example, a 'charge' of compressed air is suddenly introduced into the working cylinder above the piston, thereby forcing that piston through a driving stroke, while driving that nail into the workpiece.

Most pneumatic tools also use a 'charge' of compressed air to raise (or return) the piston back to its starting position, so a new driving event can occur, as needed. It is typical for this second 'charge' of compressed air to also be discharged to atmosphere after every return event. In essence, such compressed air tools require an inexhaustible supply of compressed air to operate.

Fusion® Fastener Driving Tools

Another major type of fastener driving tool has become very popular, which uses pressurized gas to drive the fastener, and a mechanical lifter to return the piston for another driving event. But the FUSION tools are of a special breed: they do not exhaust their pressurized gas after each driving stroke; in fact, they never exhaust their pressurized gas, and the same 'charge' of pressurized gas is used over and over for thousands of fastener driving events. FUSION tools are battery-powered, and therefore, they do not need any air hose, or any power cords, connected to the tool, making these tools supremely portable on a jobsite.

The original FUSION tool was introduced by Senco Products, Inc., and there are several U.S. and foreign patents that describe this design in detail. (See below for a list of such patents.) The "FUSION concept" is generally the basis for the disclosure provided below. In a FUSION-type tool, a volume of pressurized gas is stored on-board the tool itself, and is made available to drive a piston that reciprocates within a working cylinder (much like a pneumatic tool, described above). But the FUSION tool does not exhaust (i.e., vent to atmosphere) its 'working gas' after a driving stroke, and instead, that pressurized gas is retained inside the tool.

To return the piston to its original position, some type of 'lifter' is needed, and FUSION tools use an electric motor that drives a rotary-to-linear lifter that forces the tool's driver (and piston) 'upward' (i.e., in a "return direction"), and against the gas pressure. The lifter's motor requires a power source, and most (if not all) FUSION-type tools include an on-board battery that provides the energy for that motor. Since the internally-stored gas pressure is being lifted against, the lifter needs to be rather robust.

SUMMARY

Accordingly, it is an advantage to provide a lifter main drive subassembly for a fastener driving tool that uses two small motors, one on each side of a gearbox, and a single-piece elongated "gearbox input shaft" that extends from the first motor, through the gearbox, and further extends through the second motor, and which acts as the mechanical drive input to the gearbox. The gearbox then reduces the rotational speed and outputs its mechanical drive to a lifter rotor that has multiple protrusions that mechanically engage with extensions on a driver so as to lift the driver toward a "Ready Position" during a lifting stroke. The driver will then be in a physical position to quickly drive a fastener during a driving stroke of the tool.

It is another advantage to provide a lifter main drive subassembly for a fastener driving tool that uses two small motors, one on each side of a gearbox, and a single-piece elongated "gearbox input shaft" that extends from the first motor, through the gearbox, and further extends through the second motor, and which acts as the mechanical drive input to the gearbox. The gearbox then reduces the rotational speed and outputs its mechanical drive to a lifter rotor that has multiple protrusions that are used to lift a driver during a lifting stroke. The gearbox input shaft and the multiple-protrusions lifter rotor all rotate on the same axis of rotation, which provides for a very compact arrangement.

It is yet another advantage to provide a lifter main drive subassembly for a fastener driving tool that uses two small motors, one on each side of a gearbox, and a single-piece elongated "gearbox input shaft" that extends from the first motor, through the gearbox, and further extends through the second motor, and which acts as the mechanical drive input to the gearbox. In one embodiment, the gearbox is a strain-wave gearbox that provides a significant gear ratio reduction in a very small space, which allows for a very compact arrangement of the motors, gearbox, and a lifter rotor that has multiple protrusions that are used to lift a driver during a lifting stroke.

It is still another advantage to provide a lifter main drive subassembly for a fastener driving tool that uses at least one small motor that drives a compact gearbox, in which the output shaft of the motor extends into the gearbox as the mechanical drive input to the gearbox, and thus acts as a combination "gearbox input shaft." The gearbox then reduces the rotational speed and outputs its mechanical drive to a lifter rotor that has multiple protrusions that mechanically engage with extensions on a driver so as to lift the driver toward a Ready Position during a lifting stroke. The gearbox input shaft extends in a direction that is transverse to a longitudinal direction of travel of the driver.

It is a further advantage to provide a lifter main drive subassembly for a fastener driving tool that uses a small motor that drives a compact gearbox, in which the motor is mounted near a rotary-to-linear lifter on one side of the lifter, and the gearbox is mounted on the opposite side of the lifter. The motor's output shaft gearbox acts as the mechanical drive input to the gearbox, and the gearbox then reduces the rotational speed and outputs its mechanical drive to a lifter rotor that has multiple protrusions that mechanically engage with extensions on a driver so as to lift the driver toward a Ready Position during a lifting stroke. This arrangement is very compact, and eliminates the need for an elongated motor housing.

It is a yet further advantage to provide a lifter main drive subassembly for a fastener driving tool that uses a small motor that drives a compact gearbox, in which the motor is mounted near a rotary-to-linear lifter on one side of the lifter, and uses a drive belt to act as the mechanical drive input to the gearbox, which is mounted on the same side of the lifter. The gearbox then reduces the rotational speed and outputs its mechanical drive to a lifter rotor that has multiple protrusions that mechanically engage with extensions on a driver so as to lift the driver toward a Ready Position during a lifting stroke. This arrangement is very compact, and eliminates the need for an elongated motor housing.

It is a still further advantage to provide a lifter main drive subassembly for a fastener driving tool that uses a small motor that drives a compact gearbox, in which the motor is mounted near a rotary-to-linear lifter on one side of the lifter, and uses a short output shaft that is directed to the gearbox input shaft with a change in rotational direction therebetween. The gearbox is centrally-located and fits within an open space formed by a lifter rotor, in which the gearbox reduces the rotational speed and outputs its mechanical drive to the lifter rotor which has multiple protrusions that mechanically engage with extensions on a driver so as to lift the driver toward a Ready Position during a lifting stroke. This arrangement is very compact, and eliminates the need for an elongated motor housing.

Additional advantages and other novel features will be set forth in part in the description that follows and in part will become apparent to those skilled in the art upon examination of the following or may be learned with the practice of the technology disclosed herein.

To achieve the foregoing and other advantages, and in accordance with one aspect, an apparatus/machine is provided, which comprises: a mechanical drive assembly for a fastener driving tool, the drive assembly comprising: a gearbox, the gearbox including a gearbox input shaft that is rotatable, and a gearbox output shaft that is rotatable, the gearbox creating a ratio change such that the gearbox input shaft and the gearbox output shaft rotate at different rotational speeds; a first motor that is mounted proximal to a first side of the gearbox; and a second motor that is mounted proximal to a second, opposite side of the gearbox; wherein the gearbox input shaft extends into, and is shared by, both the first and second motors, such that if the first and second motors are activated, the first and second motors then cause the gearbox input shaft to rotate; a driver that is sized and shaped to contact a fastener and to drive a fastener from the fastener driving tool along a longitudinal axis of movement of the driver, during a driving portion of an operating cycle of the fastener driving tool, the driver including a plurality of spaced-apart extensions; a lifter that includes a lifter rotor that is rotatable, and that is in mechanical communication with the gearbox output shaft, the lifter rotor including at least one protrusion at an outer surface of the lifter rotor, the at least one protrusion being sized and shaped to mechanically engage with the plurality of spaced-apart extensions of the driver at least during a lifting portion of the operating cycle of the fastener driving tool.

In accordance with another aspect, a fastener driving tool is provided, which comprises: a working cylinder that includes a cylindrical sleeve and a movable piston therewithin; a storage chamber that is in fluidic communication with the working cylinder, the storage chamber being charged with a pressurized gas; a driver that is in mechanical communication with the movable piston, the driver having a direction of movement along a longitudinal axis of the fastener driving tool, the driver including a plurality of spaced-apart extensions; the pressurized gas causing the movable piston to move along the longitudinal axis of the tool during a driving portion of the operating cycle of the fastener driving tool, wherein the pressurized gas is not vented to atmosphere during each operating cycle of the fastener driving tool, but instead the pressurized gas is re-used for a plurality of operating cycles; a gearbox, the gearbox including a gearbox input shaft that is rotatable, and a gearbox output shaft that is rotatable, the gearbox creating a ratio change such that the gearbox input shaft and the gearbox output shaft rotate at different rotational speeds; a lifter that includes a lifter rotor that is rotatable, and that is in mechanical communication with the gearbox output shaft, the lifter rotor including at least one protrusion at an outer surface of the lifter rotor, the at least one protrusion being sized and shaped to mechanically engage with the plurality of spaced-apart extensions of the driver at least during a lifting portion of the operating cycle of the fastener driving tool; a first motor that is mounted proximal to a first side of the lifter; and a second motor that is mounted proximal to a second, opposite side of the lifter; wherein: the first motor, the second motor, and the gearbox share an elongated single rotatable shaft.

In accordance with yet another aspect, an apparatus/machine is provided, which comprises: a mechanical drive assembly for a fastener driving tool, the drive assembly comprising: (a) a gearbox, the gearbox including a gearbox input shaft that is rotatable, and a gearbox output shaft that is rotatable, the gearbox creating a ratio change such that the gearbox input shaft and the gearbox output shaft rotate at different rotational speeds; (b) at least one motor, the at least one motor including a motor shaft that is rotatable; (c) a driver that is sized and shaped to contact a fastener and to drive a fastener from the fastener driving tool along a longitudinal axis of movement of the driver, during a driving portion of an operating cycle of the fastener driving tool, the driver including a plurality of spaced-apart extensions; and (d) a lifter that includes a lifter rotor that is rotatable, and that is in mechanical communication with the gearbox output shaft, the lifter rotor including at least one protrusion at an outer surface of the lifter rotor, the at least one protrusion being sized and shaped to mechanically engage with the plurality of spaced-apart extensions of the driver at least during a lifting portion of the operating cycle of the fastener driving tool; (e) wherein: (i) the motor shaft of the at least one motor is co-linear with the gearbox input shaft, and is mechanically coupled to the gearbox input shaft, and causes the gearbox input shaft to rotate during at least the lifting portion of the operating cycle of the fastener driving tool; (ii) the gearbox input shaft is in mechanical communication with the lifter rotor through the gearbox, and causes the lifter rotor to rotate during at least the lifting portion of the operating cycle of the fastener driving tool; (iii) the gearbox output shaft is substantially parallel to, or is co-linear with, the gearbox input shaft; (iv) the gearbox output shaft is substantially parallel to, or is co-linear with, an axis of rotation of the lifter rotor; and (v) the axis of rotation of the at least one motor is in a transverse direction with respect to the longitudinal axis of movement of the driver.

In accordance with still another aspect, an apparatus/machine is provided, which comprises: a mechanical drive assembly for a fastener driving tool, the drive assembly comprising: a gearbox, the gearbox including a gearbox input shaft that is rotatable, and a gearbox output shaft that is rotatable, the gearbox creating a ratio change such that the gearbox input shaft and the gearbox output shaft rotate at different rotational speeds; a driver that is sized and shaped to contact a fastener and to drive a fastener from the fastener driving tool along a longitudinal axis of movement of the driver, during a driving portion of an operating cycle of the fastener driving tool, the driver including a plurality of spaced-apart extensions; and a lifter which includes a lifter rotor that is rotatable, and that is in mechanical communication with the gearbox output shaft, the lifter rotor including at least one protrusion at an outer surface of the lifter rotor, the at least one protrusion being sized and shaped to mechanically engage with the plurality of spaced-apart extensions of the driver at least during a lifting portion of the operating cycle of the fastener driving tool; and a motor that is mounted proximal to a first side of the lifter; wherein: the gearbox is mounted proximal to a second, opposite side of the lifter; and the gearbox input shaft extends into, and is shared by, the motor, such that if the motor is activated, the motor then causes the gearbox input shaft to rotate.

In accordance with a further aspect, an apparatus/machine is provided, which comprises: a mechanical drive assembly for a fastener driving tool, the drive assembly comprising: a gearbox, the gearbox including a gearbox input shaft that is rotatable, and a gearbox output shaft that is rotatable, the gearbox creating a ratio change such that the gearbox input shaft and the gearbox output shaft rotate at different rotational speeds; a driver that is sized and shaped to contact a fastener and to drive a fastener from the fastener driving tool along a longitudinal axis of movement of the driver, during a driving portion of an operating cycle of the fastener driving tool, the driver including a plurality of spaced-apart extensions; and a lifter which includes a lifter rotor that is rotatable, and that is in mechanical communication with the gearbox output shaft, the lifter rotor including at least one protrusion at an outer surface of the lifter rotor, the at least one protrusion being sized and shaped to mechanically engage with the plurality of spaced-apart extensions of the driver at least during a lifting portion of the operating cycle of the fastener driving tool; a motor that includes a motor output shaft that is rotatable; and a flexible drive belt that transfers rotational energy from the motor output shaft to the gearbox input shaft.

In accordance with a yet further aspect, an apparatus/machine is provided, which comprises: a mechanical drive assembly for a fastener driving tool, the drive assembly comprising: a gearbox, the gearbox including a gearbox input shaft that is rotatable, and a gearbox output shaft that is rotatable, the gearbox creating a ratio change such that the gearbox input shaft and the gearbox output shaft rotate at different rotational speeds; a driver that is sized and shaped to contact a fastener and to drive a fastener from the fastener driving tool along a longitudinal axis of movement of the driver, during a driving portion of an operating cycle of the fastener driving tool, the driver including a plurality of spaced-apart extensions; and a lifter which includes a lifter rotor that is rotatable, and that is in mechanical communication with the gearbox output shaft, the lifter rotor including at least one protrusion at an outer surface of the lifter rotor, the at least one protrusion being sized and shaped to mechanically engage with the plurality of spaced-apart extensions of the driver at least during a lifting portion of the operating cycle of the fastener driving tool; and a motor that includes a motor output shaft that is rotatable, the motor output shaft being directed to the gearbox input shaft with a change in rotational direction therebetween; wherein: the outer surface of the lifter rotor outer surface is substantially cylindrical in shape, and the at least one protrusion extends outwardly at approximately a right angle with respect to the outer surface; and the outer surface of the lifter rotor forms a central, open space, and the gearbox is physically positioned within the open space.

In accordance with a still further aspect, an apparatus/machine is provided, which comprises: a mechanical drive assembly for a fastener driving tool, the drive assembly comprising: a main body, which includes (a) a working cylinder that comprises a cylindrical sleeve and a movable piston therewithin; and (b) a storage chamber that is in fluidic communication with the working cylinder at least during a driving portion of an operating cycle of the fastener driving tool, the storage chamber containing a pressurized gas; a driver that is in mechanical communication with the movable piston, the driver having a direction of movement along a longitudinal axis of the fastener driving tool, the driver including a plurality of spaced-apart extensions; the pressurized gas causing the movable piston to move along the longitudinal axis of the fastener driving tool during the driving portion of the operating cycle of the fastener driving tool, wherein the pressurized gas is not vented to atmosphere during each operating cycle of the fastener driving tool, but instead the pressurized gas is re-used for a plurality of operating cycles; a trigger handle that extends from the main body of the fastener driving tool; a gearbox that includes a gearbox input shaft that is rotatable, and a gearbox output shaft that is rotatable, the gearbox creating a ratio change such that the gearbox input shaft and the gearbox output shaft rotate at different rotational speeds; a lifter that includes a lifter rotor that is rotatable, and that is in mechanical communication with the gearbox output shaft, the lifter rotor including at least one protrusion at an outer surface of the lifter rotor, the at least one protrusion being sized and shaped to mechanically engage with the plurality of spaced-apart extensions of the driver at least during a lifting portion of the operating cycle of the fastener driving tool; and at least one motor that includes a motor shaft, the motor shaft being in mechanical communication with the gearbox input shaft; wherein, the fastener driving tool having: an X-axis extending in a direction that is substantially perpendicular to the longitudinal axis of the fastener driving tool; a Y-axis extending in a direction that is substantially parallel to the longitudinal axis of the fastener driving tool; a Z-axis extending in a direction that is substantially parallel to an axis of rotation of the motor shaft of the at least one motor; wherein: the X-axis and the Y-axis are perpendicular to one another, the X-axis and the Z-axis are perpendicular to one another, and the Y-axis and the Z-axis are perpendicular to one another; the trigger handle lies substantially in a plane defined by the X-axis and the Y-axis; an axis of rotation of the gearbox output shaft is substantially parallel to the Z-axis; and an axis of rotation of the lifter rotor is substantially parallel to the Z-axis.

Still other advantages will become apparent to those skilled in this art from the following description and drawings wherein there is described and shown a preferred embodiment in one of the best modes contemplated for carrying out the technology. As will be realized, the technology disclosed herein is capable of other different embodiments, and its several details are capable of modification in various, obvious aspects all without departing from its principles. Accordingly, the drawings and descriptions will be regarded as illustrative in nature and not as restrictive.

BRIEF DESCRIPTION OF THE DRAWINGS

The accompanying drawings incorporated in and forming a part of the specification illustrate several aspects of the technology disclosed herein, and together with the description and claims serve to explain the principles of the technology. In the drawings:

DETAILED DESCRIPTION

Figure 1:
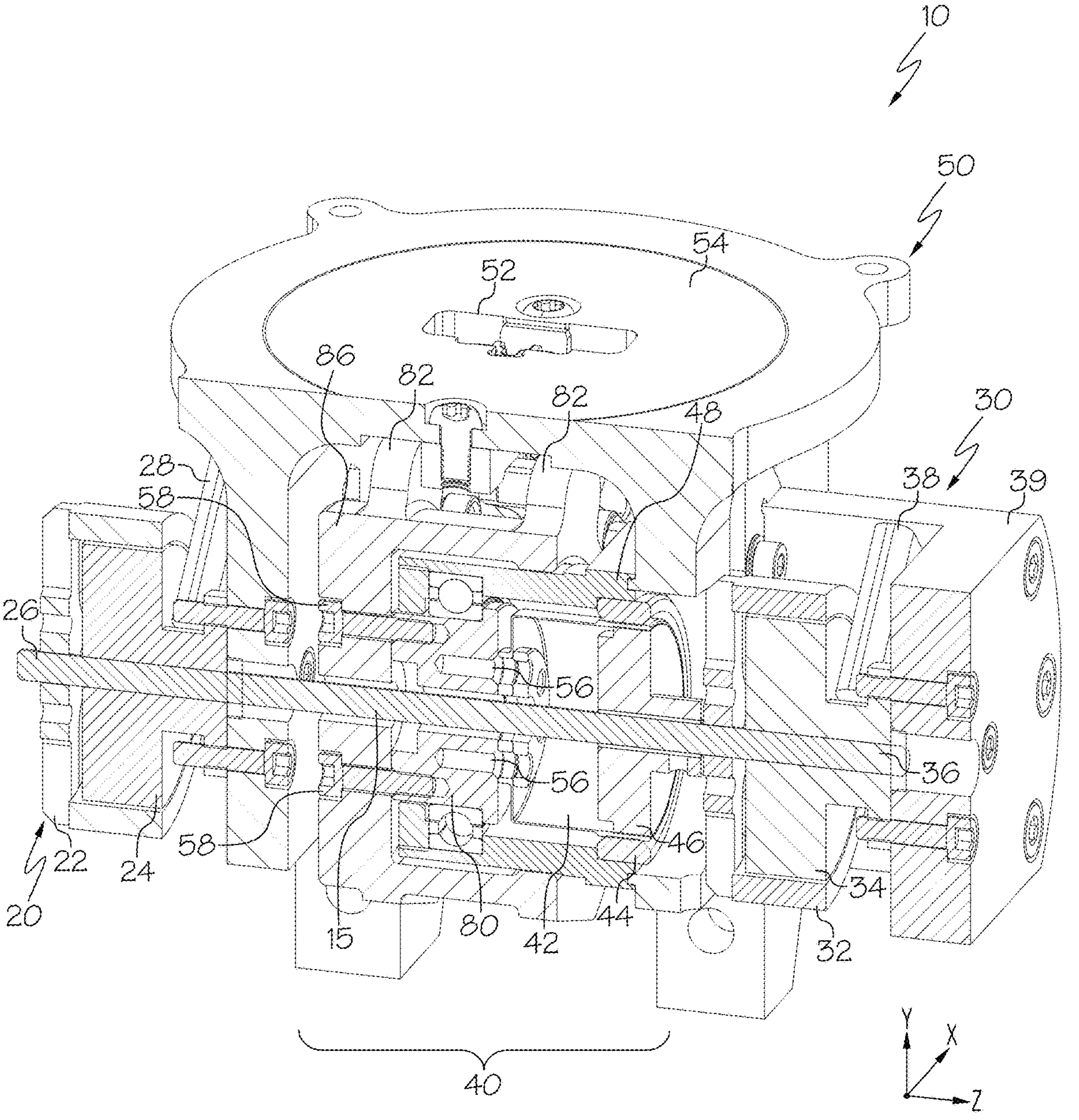
FIG. 1 is a frontal perspective view in partial cross-section of a first embodiment of a lifter subassembly for use in a fastener driving tool, as constructed according to the principles of the technology disclosed herein.

Reference will now be made in detail to the present preferred embodiment, an example of which is illustrated in the accompanying drawings, wherein like numerals indicate the same elements throughout the views.

It is to be understood that the technology disclosed herein is not limited in its application to the details of construction and the arrangement of components set forth in the following description or illustrated in the drawings. The technology disclosed herein is capable of other embodiments and of being practiced or of being carried out in various ways. Also, it is to be understood that the phraseology and terminology used herein is for the purpose of description and should not be regarded as limiting. The use of "including," "comprising," or "having" and variations thereof herein is meant to encompass the items listed thereafter and equivalents thereof as well as additional items. Unless limited otherwise, the terms "connected," "coupled," or "mounted," and variations thereof herein are used broadly and encompass direct and indirect connections, couplings, or mountings. In addition, the terms "connected" or "coupled" and variations thereof are not restricted to physical or mechanical connections or couplings. Furthermore, the terms "communicating with" or "in communications with" refer to two different physical or virtual elements that somehow pass signals or information between each other, whether that transfer of signals or information is direct or whether there are additional physical or virtual elements therebetween that are also involved in that passing of signals or information. Moreover, the term "in communication with" can also refer to a mechanical, hydraulic, or pneumatic system in which one end (a "first end") of the "communication" may be the "cause" of a certain impetus to occur (such as a mechanical movement, or a hydraulic or pneumatic change of state) and the other end (a "second end") of the "communication" may receive the "effect" of that movement/change of state, whether there are intermediate components between the "first end" and the "second end," or not. If a product has moving parts that rely on magnetic fields, or somehow detects a change in a magnetic field, or if data is passed from one electronic device to another by use of a magnetic field, then one could refer to those situations as items that are "in magnetic communication with" each other, in which one end of the "communication" may induce a magnetic field, and the other end may receive that magnetic field, and be acted on (or otherwise affected) by that magnetic field.

The terms "first" or "second" preceding an element name, e.g., first inlet, second inlet, etc., are used for identification purposes to distinguish between similar or related elements, results or concepts, and are not intended to necessarily imply order, nor are the terms "first" or "second" intended to preclude the inclusion of additional similar or related elements, results or concepts, unless otherwise indicated.

First Embodiment

Referring now to FIG. 1, a perspective cutaway view, a lifter main drive subassembly (S/A) is illustrated, generally designated by the reference numeral 10. In this illustrated embodiment, the subassembly 10 includes two motors 20 and 30, which will sometimes be referred to herein as a "first motor" 20 and a "second motor" 30. It will be understood that other embodiments for a lifter main drive subassembly could utilize other numbers of motors, including a single motor, if desired.

The first motor 20 includes a rotor 22, a stator 24, and an output shaft portion 26. In an actual tool, the motor 20 would typically be enclosed by a housing. The electrical wires for the first motor are depicted at 28. As will be understood by a skilled artisan, this first motor 20 is an "outrunner" motor, in which the rotor 22 is to the outer portion of the motor, while the stator 24 is to the inner portion of the motor. It will be understood that any type of motor could be used for the first motor, as desired by the tool's designer.

The second motor 30 includes a rotor 32, a stator 34, and an output shaft portion 36. In an actual tool, the motor 30 would typically be enclosed by a housing (or cover), and a portion of such housing is illustrated at 39, which acts as a support mount for the stator 34. The electrical wires for the second motor are depicted at 38. As will be understood by a skilled artisan, this second motor 30 also is an "outrunner" motor, in which the rotor 32 is to the outer portion of the motor, while the stator 34 is to the inner portion of the motor. It will be understood that any type of motor could be used for the second motor, as desired by the tool's designer.

The lifter main drive S/A 10 includes a gearbox between the two motors 20 and 30, in which the gearbox is generally designated by the reference numeral 40. In this first embodiment 10, the gearbox is a strain-wave gearbox, which includes a cup-shaped flex-spline 42, a circular spline 44, and an oval rotor 46. The motors 20 and 30 provide motive power for a gearbox shaft, which is generally designated by the reference numeral 15. The gearbox shaft 15 acts as the input shaft for the strain-wave gearbox 40, and when the gearbox shaft rotates, the oval rotor 46 is caused to rotate, via a fastener 18.

The oval rotor 46 acts as a wave generator to move the flex-spline 42 and the circular spline 44 through their normal movements, which cause a desired gear ratio reduction. The cup-shaped flex-spline 42 is ultimately coupled to a lifter rotor 86 that exhibits multiple protrusions 82, and these protrusions physically interact with a series of extensions 92 on the driver. (See, for example, FIG. 4, below.) Therefore, when the strain-wave gearbox rotates, the driver is forced 'upward'—i.e., against pressurized gas within the working cylinder (not shown in FIG. 1)—and is thus 'lifted' in a "return stroke" (or "lifting stroke") toward a position in which the piston/driver combination will later be able to engage in a "driving stroke" upon demand.

This lifter main drive S/A 10 is designed for working in a FUSION-type fastener driving tool, and with that in mind, the mechanical drive for S/A 10 should be relatively robust, since the lifter must force the piston in the working cylinder back 'up' against significant pressurized gas. One must keep in mind that this is the same pressurized gas that is capable of forcing that same piston/driver/working cylinder combination to drive a fastener into a wood or metal target workpiece.

The main purpose of the gearbox 40 is two-fold: its first purpose is to provide a gear ratio reduction that reduces its output rotation rate (in revolutions per minute), because the lifter itself does not need to move as quickly as the motors (20 and 30) would typically rotate at their respective output shaft portions 26 and 36. Its second purpose is to increase the torque so that the lifter is well able to force a driver 90 (not shown in FIG. 1) and its associated piston 72 (also not shown in FIG. 1) 'up' against pressurized gas in a working cylinder 70 (also not shown in FIG. 1). If the gear ratio reduction is, for example, 100:1, then the torque increase correspondingly would be approximately 100:1.

In this first embodiment 10, the gearbox shaft 15 is co-linear with the two motor shaft portions 26 and 36. In fact, for this first embodiment 10, the gearbox shaft 15 comprises a single relatively long shaft that extends through the motors 20 and 30, and thereby includes the two motor shaft portions 26 and 36—i.e., the individual motors 20 and 30 would each include a "motor shaft portion" (26 and 36) of the single elongated gearbox shaft 15.

However, if desired by the tool's designer, this gearbox shaft 15 could alternatively be coupled to two separate motor shafts 26 and 36, but still would act as a single elongated shaft that would ensure that both motors 20 and 30 effectively provide torque to each side of the lifter's gearbox 40. Although a less elegant design, this possible alternative arrangement of separate, but coupled, shafts 15, 26, 36 would allow the motors 20 and 30 to be standard 'store-bought' motors that already include their own output shafts.

In this alternative arrangement of shafts, e.g., assuming the motors 20 and 30 are provided with their own output shafts (i.e., if they have separate shafts at 26 and 36), then those output shafts could be directly coupled to a somewhat shorter gearbox shaft 15, if desired. The overall result would still be the same; the shorter gearbox shaft 15 and both motor shafts 26 and 36 would all rotate together effectively as a single overall shaft, and thereby provide essentially equal torque and power to all portions of the lifter's gearbox 40, while maintaining a very compact physical footprint for the overall fastener driving tool.

FIG. 1 also illustrates some details above the gearbox portion. A base 50 is provided for mounting the working cylinder—as shown in more detail below. This base 50 may also be used as a "guide body" if desired by the tool's designer, in which this base would also include a driver track (not shown on FIG. 1) for guiding the movements of the driver during driving strokes and return strokes. An opening 52 in the base is depicted, showing where the driver would extend through the central area of the base 50. The base may also provide a mounting surface 54, where a "bumper" (or "piston stop") could be positioned.

Figure 2:
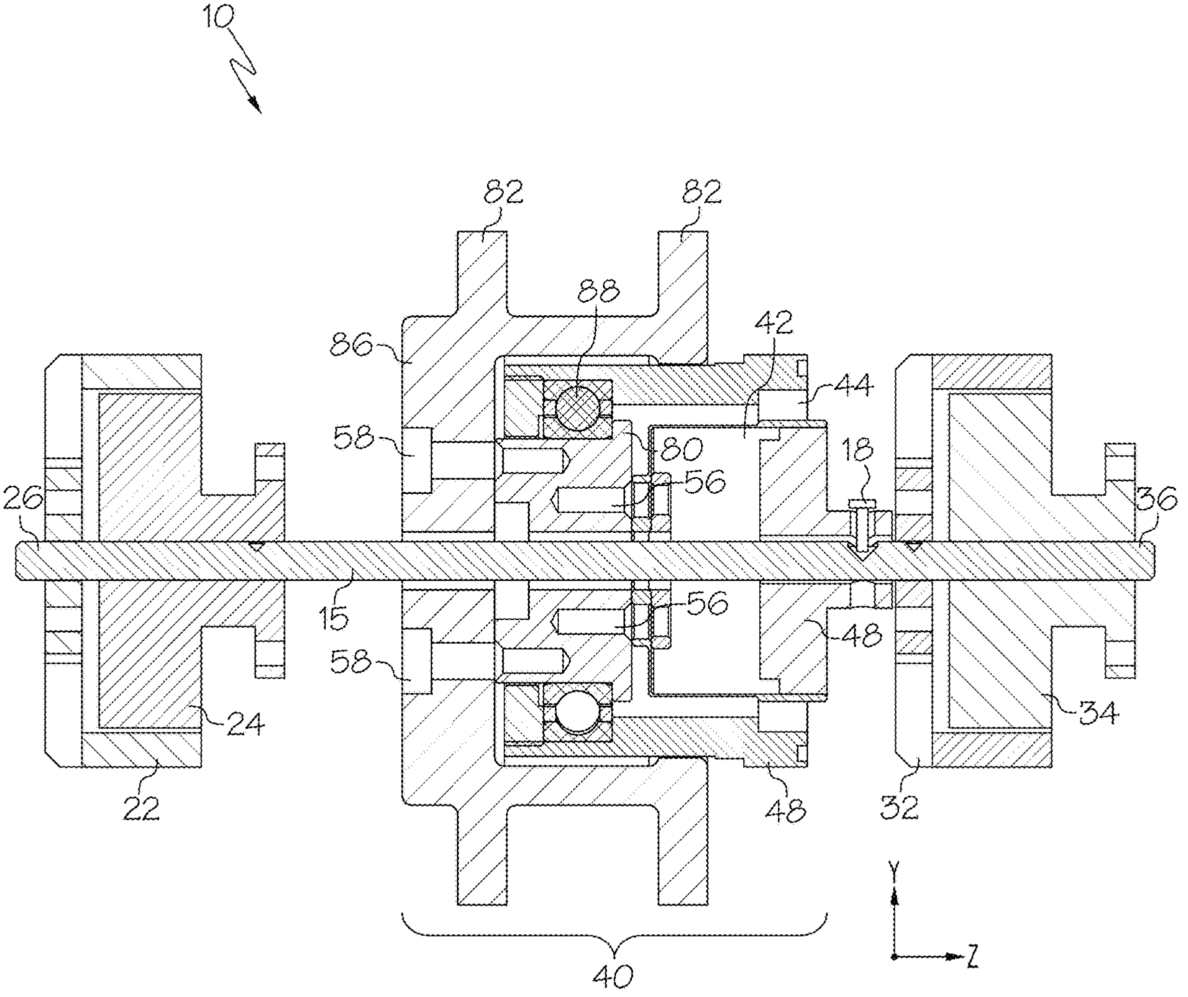
FIG. 2 is a front, elevational view in cross-section showing major components of the lifter subassembly of FIG. 1.

Referring now to FIG. 2, the same lifter main drive S/A 10 is again illustrated in a front, cutaway view. In this view, the gearbox shaft 15 can be seen to clearly be co-linear (at least in the vertical plane) with the two motor shaft portions 26 and 36. And in fact, in FIG. 2, it can be seen that the gearbox shaft 15 comprises a single elongated shaft that incorporates the motor shaft portions 26 and 36—i.e., this is a single-piece shaft that runs all the way from the first motor 20, entirely through the gearbox 40, and finally to the second motor 30.

FIG. 2 also illustrates the side-view orientation of the strainwave gearbox parts, i.e., the oval rotor 46, the circular spline 44, and the cup-shaped flex-spline 42. The flex-spline 42 then drives a thick (but hollow) gearbox output shaft 80 (via fasteners 56) that is captured by a ball bearing 88. The race of the ball bearing 88 is captured by a housing 48. The gearbox output shaft 80 drives the rotatable lifter rotor 86 (via fasteners 58), which exhibits multiple protrusions 82. These protrusions 82 physically interact with a series of extensions 92 on the driver 90 (e.g., see FIG. 4, below) during a lifting stroke of the FUSION-type tool. Note that the "lifting stroke" is also sometimes referred to herein as a "lifting portion of the operating cycle of the fastener driving tool."

An outer surface of the lifter rotor 86 forms an open space between a central region where the gearbox input shaft is located and the outer surface. The lifter rotor 86 is cup-shaped in which the outer surface is substantially cylindrical in shape, and the at least one protrusion 82 extends outwardly at approximately a right angle with respect to the outer surface. The lifter rotor 86 is positioned such that a rotational movement of the at least one protrusion 82 travels in a circle which defines a plane that intersects with the plurality of extensions 92 of the driver 90, and that plane is parallel to a longitudinal axis of movement of the driver.

It should be noted that the orientation of the first and second motors (20 and 30) are both in the same direction in FIG. 2. In other words, both motors are 'facing' to the left in this view—i.e., the spinning rotors 22 and 32 are both on the left side of their respective motors. This 'facing' situation could, of course, be easily reversed, or otherwise changed, if desired by the tool's designer, without departing from the principles of the technology disclosed herein.

Figure 3:
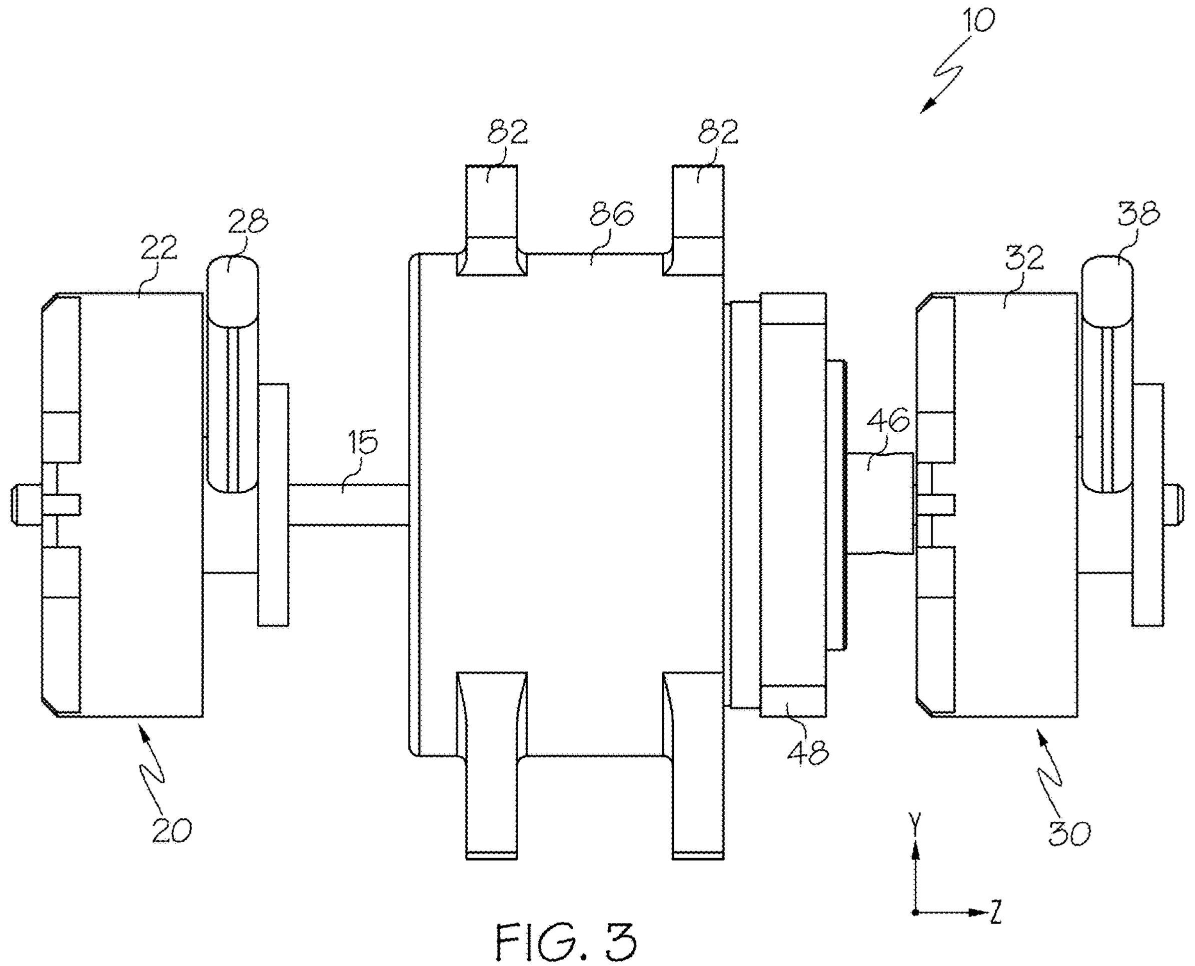
FIG. 3 is a front, elevational view showing the lifter subassembly of FIG. 1.

Referring now to FIG. 3, the same lifter main drive S/A 10 is again illustrated in a front view that is not cut-away. The rotors 22 and 32 of the first and second motors are exposed, which is somewhat typical for outrunner motors. (This entire structure would be covered by a housing for the finished—complete—tool.) Also exposed in this view is the gearbox shaft 15, as it runs between the first motor 20 and the gearbox 40. Additionally exposed in this view is a portion of the oval rotor 46, which extends toward the second motor 30.

FIG. 3 illustrates the compact design of this gearbox/lifter of S/A 10, in which the lifter rotor 86 covers almost the entire gearbox, including not only the strain-wave gearbox 40, but also the gearbox output shaft 80. This is a very compact design.

The 'compactness' of this mechanical layout is an important feature of the lifter main drive S/A 10. The previous FUSION-type tools have all had an elongated handle-sized subassembly (a "motor housing") that includes the motor and the gearbox (and perhaps some further parts), in which that elongated handle-sized subassembly extends away from the centerline of the working cylinder, usually at a 90-degree (perpendicular) angle.

While the previous FUSION-type tools are very effective devices, and are sold by several different tool companies, this new compact design is a significant improvement. By eliminating the perpendicular, elongated motor housing, this new compact design moves the center of gravity toward the centerline of the working cylinder, and therefore, will be easier to handle by the tool's user—often a carpenter or other workman who is building a house or an office space in a building. Other improvements of this new compact design are a reduction in weight and volume. One of the current FUSION tools sold by Senco includes about 100 g of ball bearings alone, and the single shaft design of the S/A 10 allows for a reduction in the number of extra pieces, such as the ball bearings 88. The S/A 10 design also allows for almost all the moving parts to be placed in a compact space up front and out of the way, providing for a reduction in overall volume of the tool.

Figure 4:
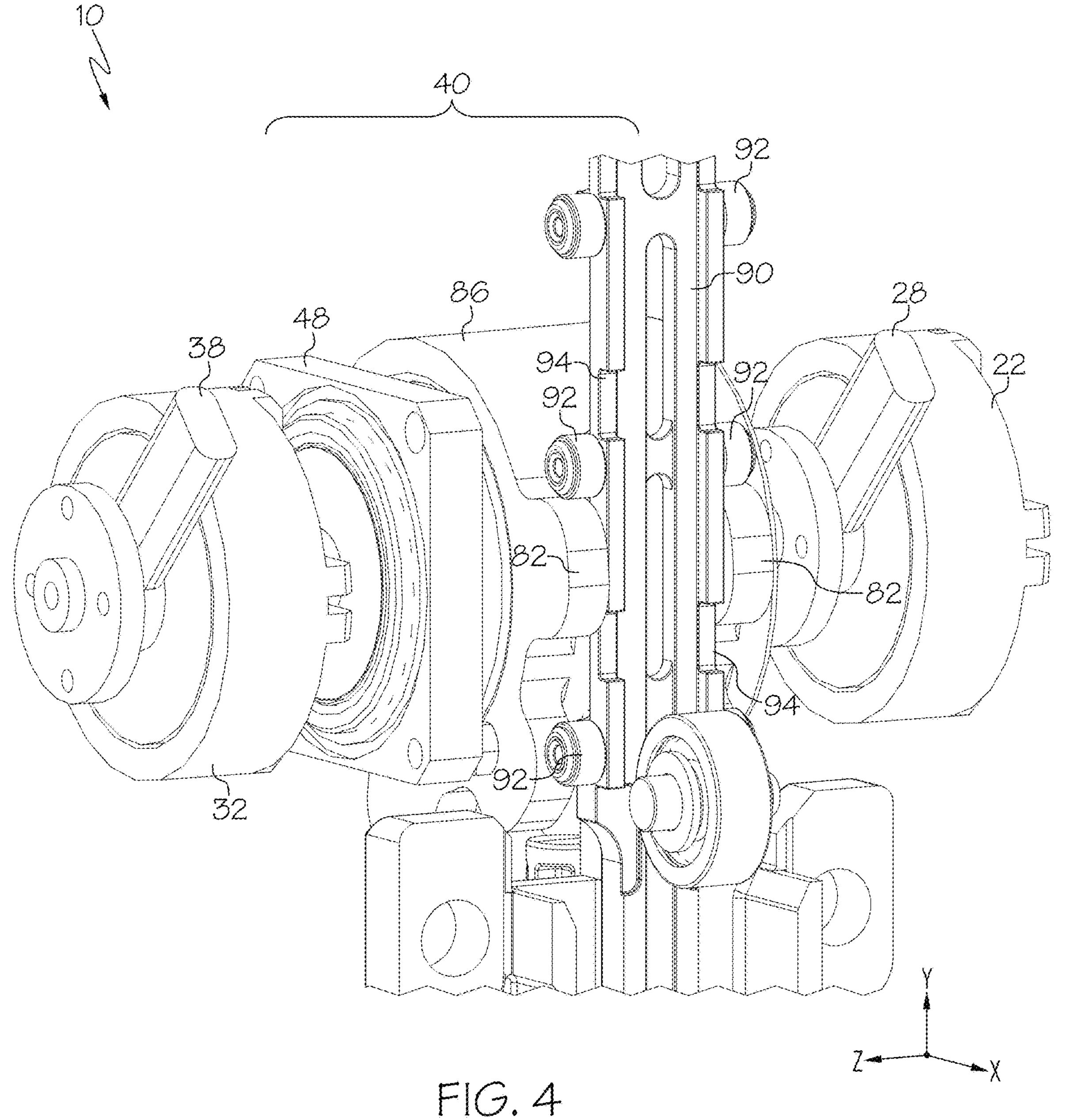
FIG. 4 is a rear perspective view of the lifter subassembly of FIG. 1, also showing a portion of the associated driver.

Referring now to FIG. 4, the lifter main drive S/A 10 is again illustrated from the opposite, rear side of the S/A 10, along with a driver 90 that extends in a vertical direction in this view. The driver 90 includes several extensions 92 that are designed to mechanically interface with the lifter protrusions 82, at least during a lifting portion (or "lifting stroke") of the tool's operating cycle. The driver 90 also includes several notches 94 that are elongated in the vertical direction in this view of FIG. 4. The notches 94 are designed to receive a pivotable latch 120—see FIG. 5, below.

The extensions 92 on the driver 90 have rollers in this illustrated design, in which the rollers are essentially shaped like small washers. These rollers are designed to provide a semi-slippery surface for interacting with the large protrusions 82 of the lifter rotor 86, as the lifter rotates to force the driver 90 "up" (in this view) during a lifting portion of an operating cycle.

Figure 5:
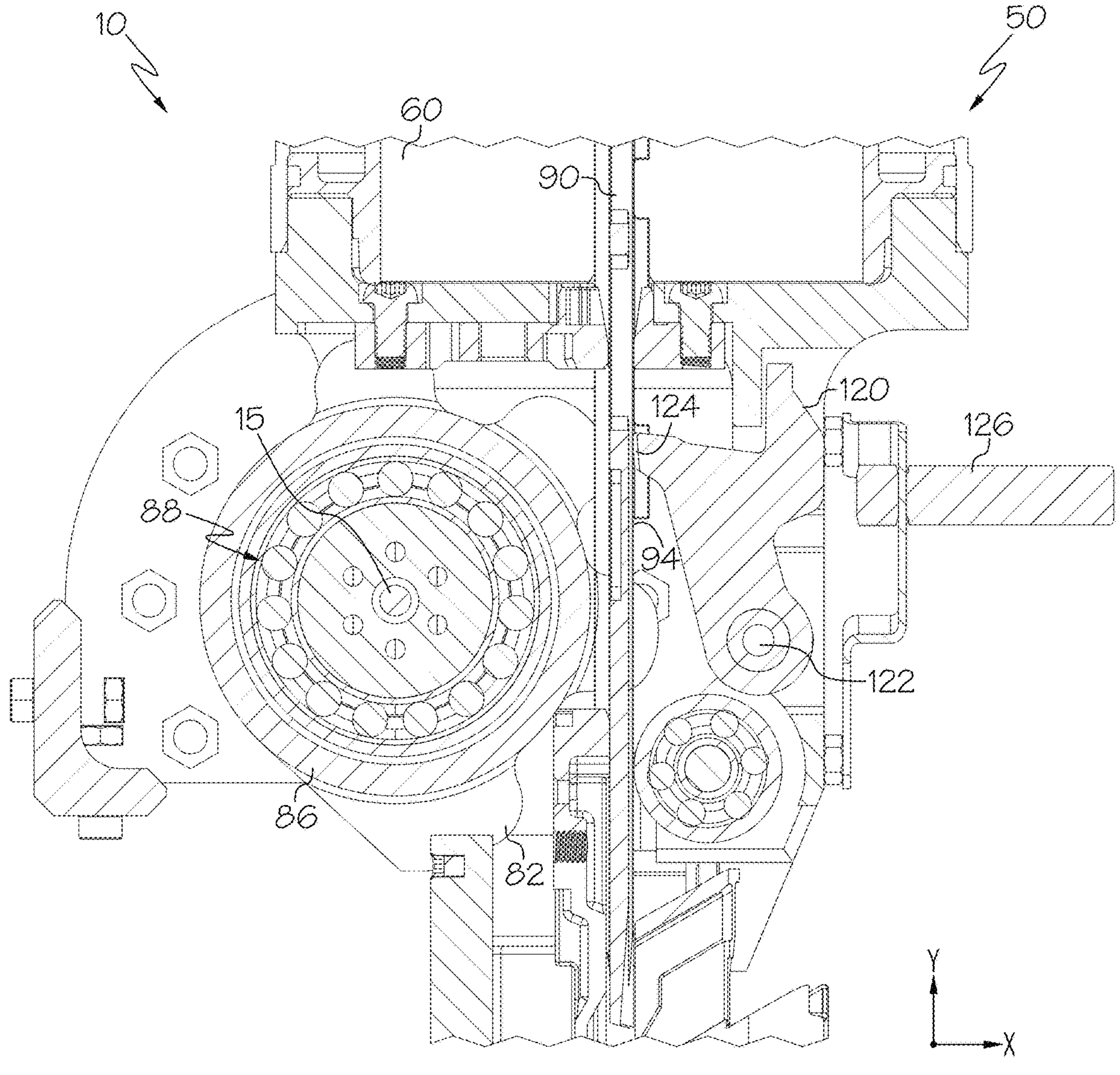
FIG. 5 is a left-side elevational view of the lifter subassembly of FIG. 1, also showing a portion of the associated driver, and the associated latch mechanism.

Referring now to FIG. 5, the lifter S/A 10 is illustrated from the left side of the tool in a cutaway view taken along a plane down the centerline of the ball bearings 88. FIG. 5 clearly shows the axis of rotation of the left-hand motor 20 and its overall elongated shaft 15. FIG. 5 also shows the physical orientation of the driver 90 with respect to the outer surface of the lifter rotor 86, and with respect to the lifter protrusions 82. It should be noted that the rotation direction of the lifter rotor 86 is counterclockwise in FIG. 5, which would force the driver 90 upwards in a linear direction along a driver track which is formed in a guide body 50 of the overall tool.

FIG. 5 also illustrates the mechanical orientation between the driver 90 and the latch 120. The latch 120 pivots at a latch pivot axis 122, and can therefore, be forced to either engage the driver 90 or to not engage the driver. The latch 120 is operated by a solenoid (not shown) in which the solenoid barrel 126 operates an extension that, when the solenoid is energized, pulls the latch 120 away from the driver 90. A "catching surface" 124 on the latch 120 is designed to interfere with the movements of the driver 90 when the latch is in an engaged position. The "engaged position" of the latch 120 is designed to occur when the solenoid is de-energized.

The so-called catching surface 124 of the latch, has a shape that fits into the multiple notches 94 of the driver. When the solenoid 126 is de-energized, the latch 120 is spring-loaded so that the latch pivots (around its pivot axis 122) toward the driver 90. The catching surface 124 is shaped so that it will tend to catch the driver 90 if the driver is attempting to move downward (in this view of FIG. 5). In this manner, the latch 120 acts as a safety device to prevent the driver 90 from moving through an entire driving stroke, unless the tool is truly ready for an actual driving stroke. The catching surface 124 is in a "safety position" when the driver 90 is at a "ready position" (after the driver has been lifted through a lifting stroke), during normal operation of the tool.

Figure 6:
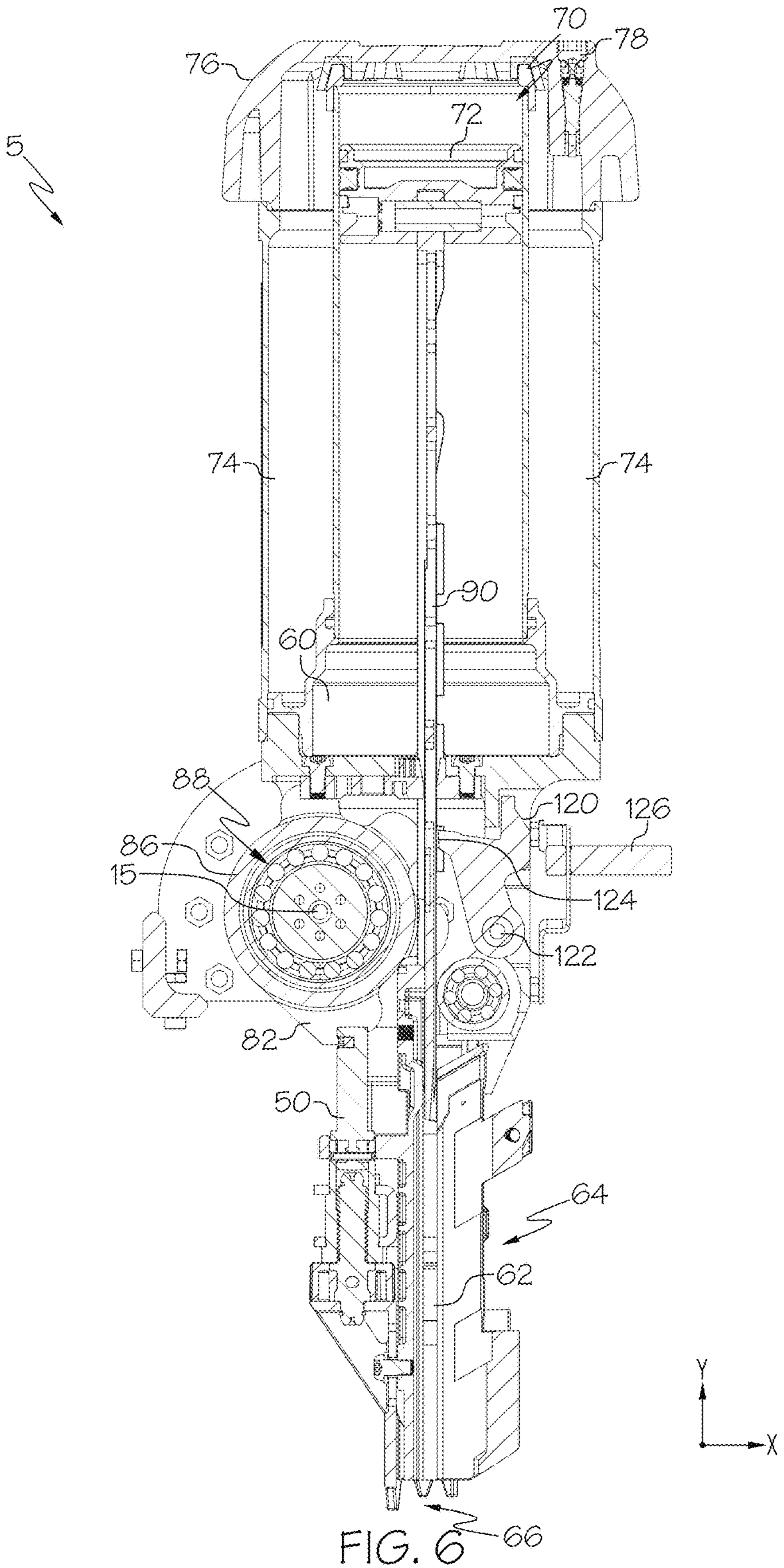
FIG. 6 is a left-side elevational view in cross-section of an entire fastener driving tool, including the lifter subassembly of FIG. 1, but without the tool's outer housing, and without its magazine, trigger handle, or battery.

Referring now to FIG. 6, the entire tool, generally referred to by reference numeral 5, is depicted in the same perspective as that of FIG. 5. As can be seen in FIG. 6, the driver 90 is attached to a movable piston 72 which is located inside a working cylinder 70. In this type of tool, there also is a storage chamber 74 that contains a pressurized gas that is shared with a displacement volume in the upper portion of the working cylinder 70. This pressurized gas is used to drive the piston 72 and its associated driver 90 toward the bottom (or exit end) of the tool 5, in which the exit end is at reference numeral 66. In this illustrated embodiment, the combination of the working cylinder 70 and the storage chamber 74 constitute a 'main body.' A trigger handle 68 typically extends from this main body.

The guide body 50 includes a driver track 62 through which the driver 90 slides during a driving stroke to drive a fastener from the exit end 66. These types of fastener driving tools typically include a magazine that would attach to the guide body 50 in the area of the reference numeral 64, in which the magazine contains multiple fasteners (such as nails), and in which a single fastener is introduced into the driver track 62 at the beginning of each driving stroke. At the top end of the tool 5 is an end cap 76, and further, a fill valve 78 is positioned at a side portion of that end cap 76.

This type of tool is similar to a FUSION® tool that was originally introduced by Senco Products, which is a predecessor corporation to the applicant, Kyocera Senco Industrial Tools, Inc. In FUSION tools, the pressurized gas in the storage chamber 74, along with the pressurized gas in the displacement volume of the working cylinder 70, is used to drive the piston through a driving stroke. However, as opposed to most "air tools," in a FUSION tool the pressurized gas driving the piston is not exhausted to atmosphere, but instead is re-used multiple times for multiple driving strokes. Therefore, when the piston 72 bottoms out against the bumper 60 at the end of a driving stroke, it will need to be "lifted" back toward the top of the tool, but this lifting operation must not only overcome the mass of the piston itself, but also it must overcome the force exerted by the pressurized gas that is impacting the top of the piston. In view of these requirements, the lifter must be quite robust.

The piston will be lifted by the lifter S/A 10 toward a "ready position" during each lifting stroke. It will be understood that this "ready position" is not at the very top travel position of the piston/driver combination, but it is designed to essentially be the rest position for the entire tool. This so-called "ready position" is near-ready to drive a fastener; however, since the latch 120 will be in place as a backup safety device to hold the piston/driver at the ready position (if needed), that latch must first be disengaged from the driver's travel before a driving stroke can occur. (That is, the latch must first be moved to a non-interfering position with respect to the travel of the driver during a driving stroke.) Also, at the beginning of each driving stroke, the lifter must rotate a little bit further so as to raise the driver a small amount of vertical distance before the driving stroke can occur—this begins to move the lifter/driver combination away from the "rest position" of the tool, which is also being defined herein as the "ready position." Then what quickly happens is that the lifter will continue to rotate, and then the "last lifter protrusion" 82 (i.e., the one that was nearest to the latch) will 'slide' away from the driver's extension 92, thereby releasing the driver so that it can drive a fastener.

The above description involves a first embodiment that uses two small motors that were mounted on opposite sides of a central gearbox. A single elongated rotatable gearbox input shaft was used to receive the rotational power of both motors, which provides the mechanical energy for rotating the gearbox input shaft. The gearbox itself is positioned within an open interior space formed by the relatively large lifter rotor, and that lifter rotor includes multiple protrusions that engage the extensions on the driver, thereby enabling the lifter rotor to "lift"the driver during a lifting stroke.

Figure 7:
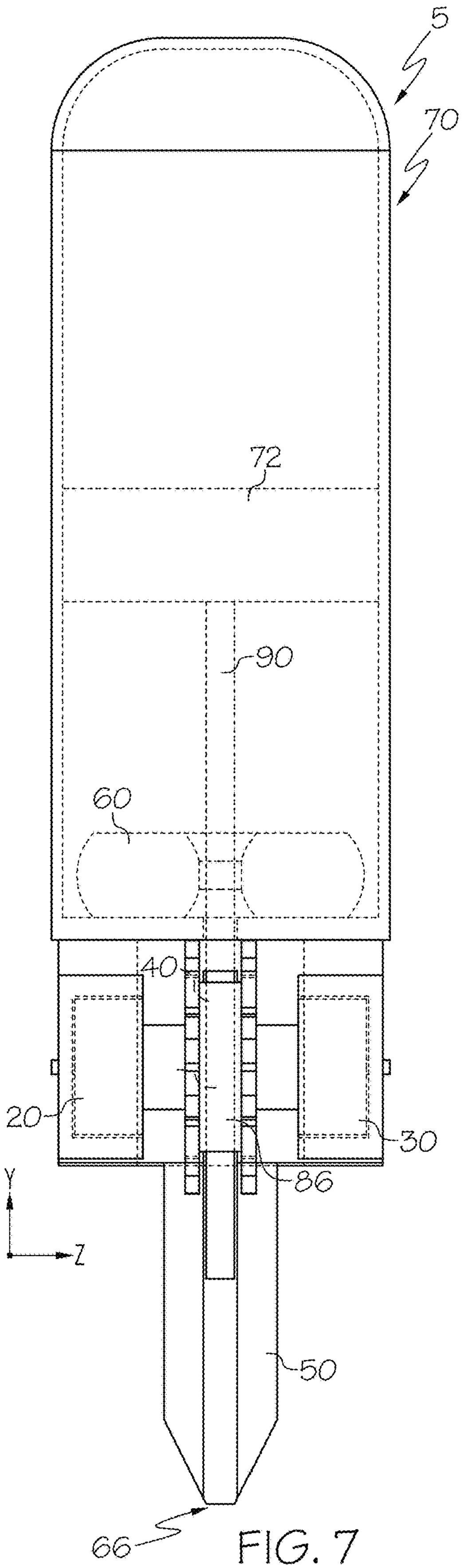
FIG. 7 is a front, elevational view of the tool and the lifter subassembly of FIG. 1, without the tool's outer housing, and not showing the magazine and the trigger handle for clarity.

Referring now to FIG. 7, the lifter rotor 86 is illustrated "below" (in this view) the driver 90, the piston 72, and the working cylinder 70. The gearbox 40 is mounted inside the lifter rotor 86, and the first motor 20 and the second motor 30 sandwich the lifter rotor 86 and the gearbox 40.

Figure 8:
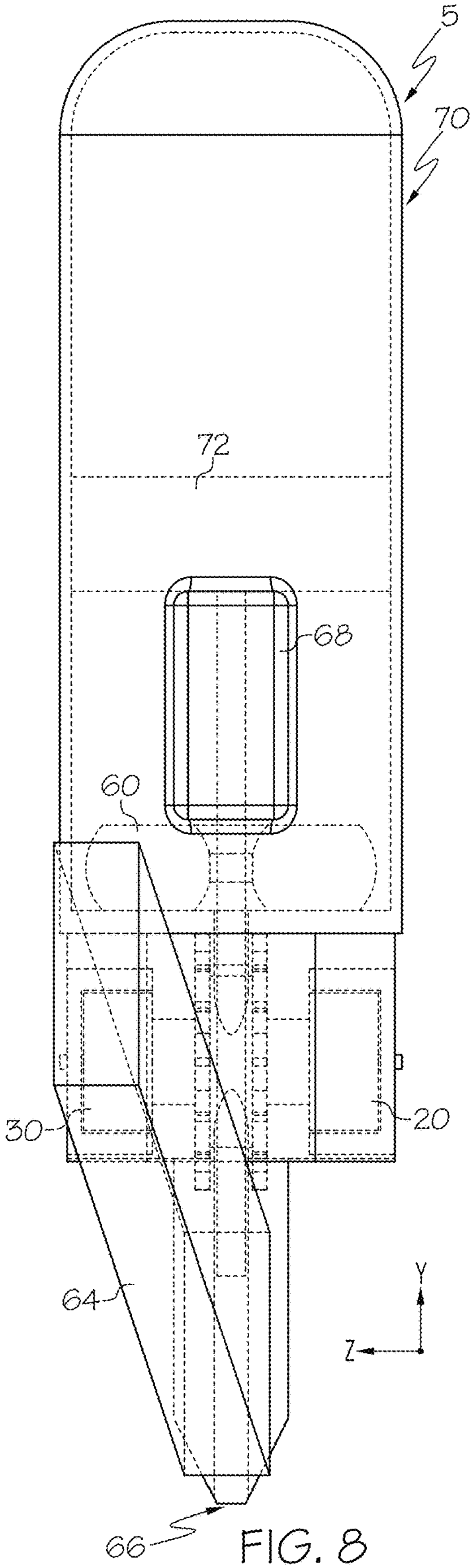
FIG. 8 is a rear, elevational view of the tool and the lifter subassembly of FIG. 1, without the tool's outer housing.

Referring now to FIG. 8, the trigger handle 68 and a magazine 64 are depicted. The magazine 64 is mounted proximal to the exit end 66 of the tool 5, and sequentially feeds fasteners into the tool. The trigger handle 68 includes a trigger (not shown), and when the user squeezes the trigger, the tool 5 will drive a fastener into a workpiece (assuming a few other preconditions are met).

Figure 9:
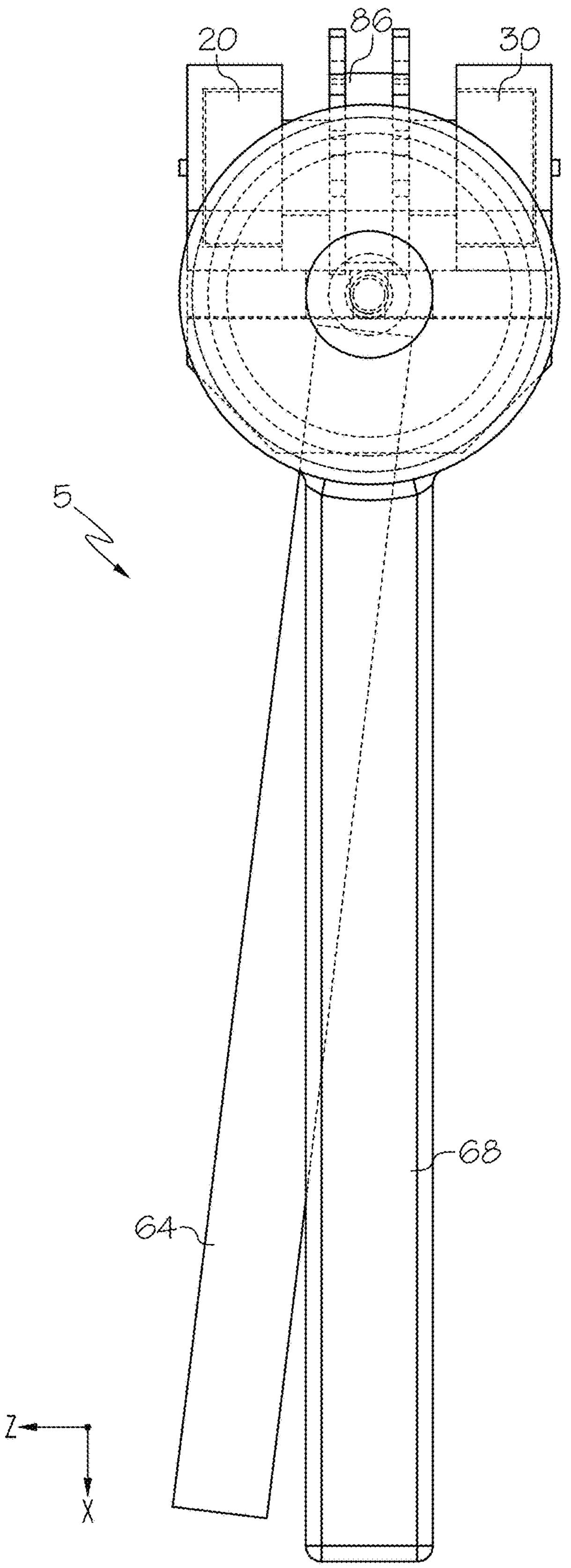
FIG. 9 is a top, elevational view of the tool without the tool's outer housing, and the lifter subassembly of FIG. 1.

Referring now to FIG. 9, the trigger handle 68 and the magazine 64 are again depicted. The magazine 64 is positioned at a slight angle compared to the trigger handle 68. The orientation of the tool 5 is depicted in FIG. 9, wherein an X-axis extends in a direction parallel to the trigger handle 68 (in this view), and a Z-axis extends in a direction parallel to the motor shafts 26 and 36, and the lifter shaft 15. (Note that in this embodiment, all three shafts 15, 26, 36 actually are a single shaft, as shown in FIG. 1, for example.) The X-axis and the Z-axis are perpendicular to one another, as indicated on FIG. 9.

Figure 10:
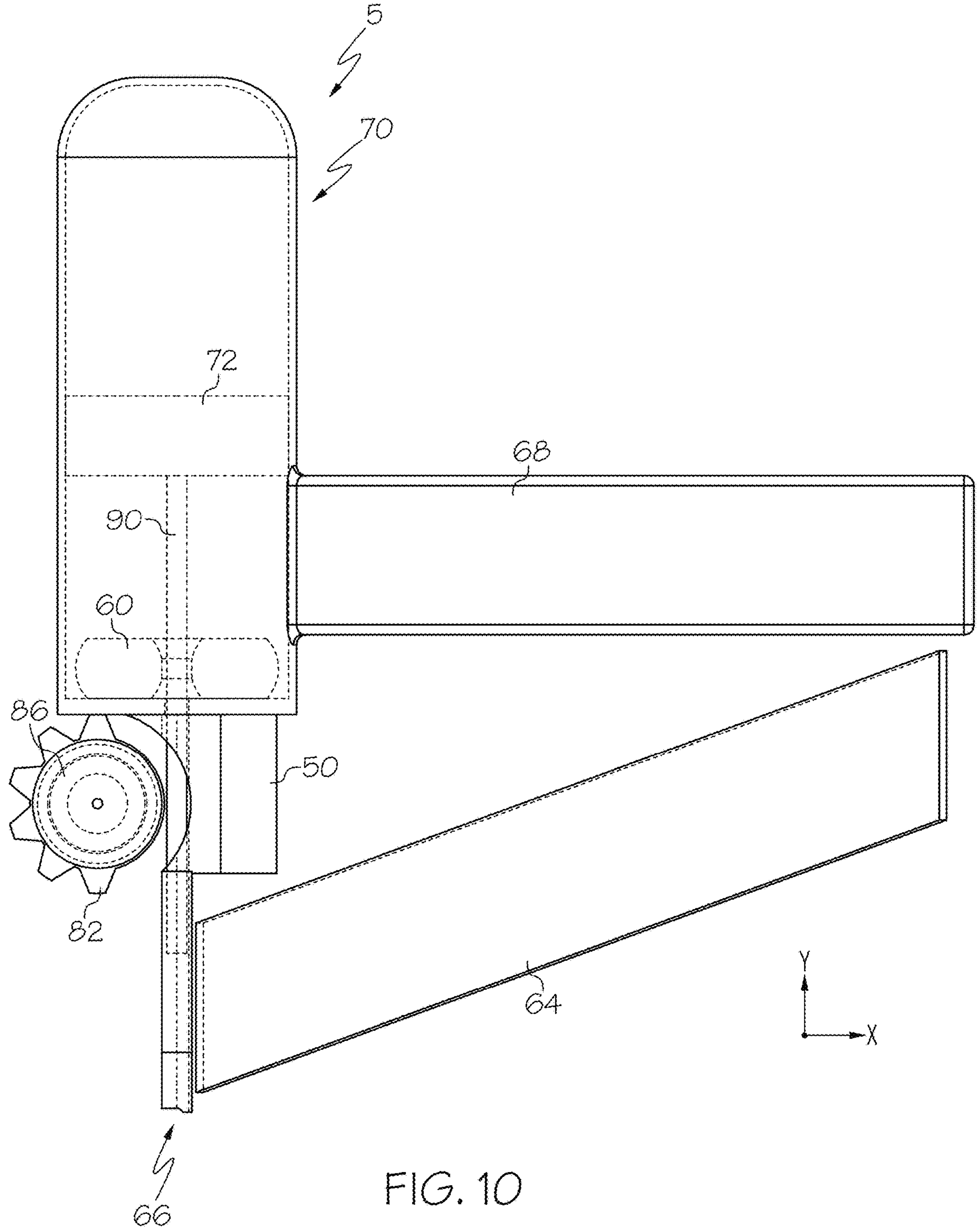
FIG. 10 is a left-side elevational view of the tool without the tool's outer housing, and the lifter subassembly of FIG. 1.
Figure 11:
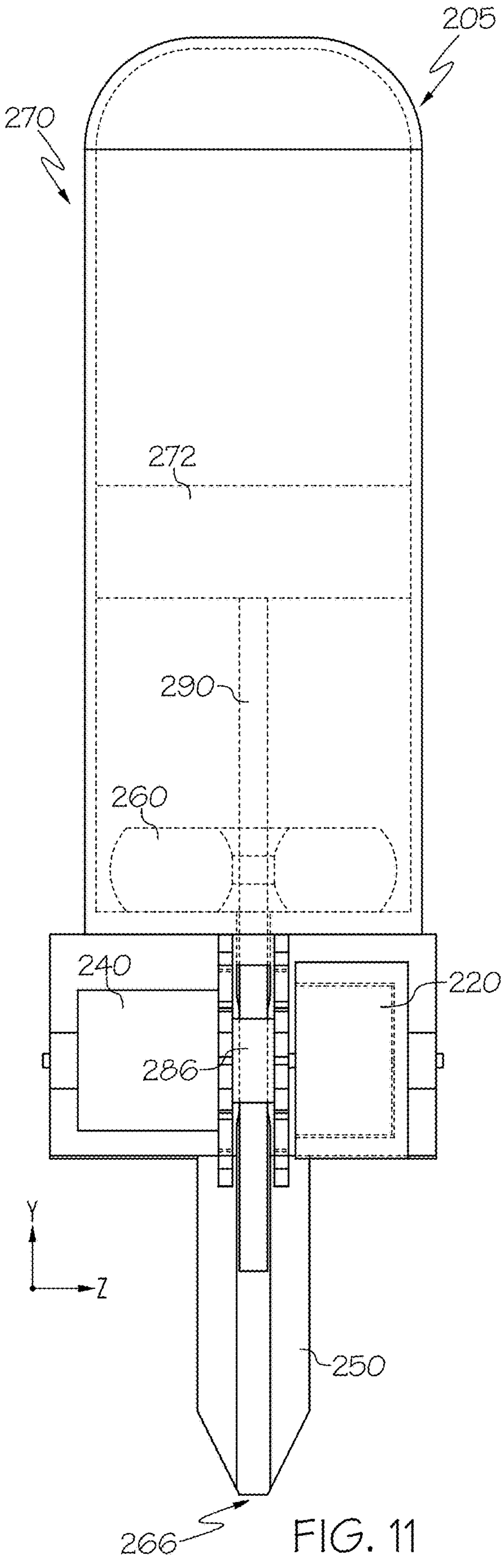
FIG. 11 is a front, elevational view in partial cut-away showing a fastener driving tool without the tool's outer housing or pressure chamber, with a first alternative embodiment lifter subassembly, and not showing the magazine and the trigger handle for clarity.

Referring now to FIG. 10, the trigger handle 68 and the magazine 64 are illustrated, along with the working cylinder 70, the piston 72, and the driver 90. The orientation of the tool 5 is depicted in FIG. 10, wherein the X-axis extends in a direction parallel to the trigger handle 68 (in this view), and a Y-axis extends in a direction parallel to the driver 90, in which the driver moves along a driver track inside a guide body 50, and that driver movement is along a longitudinal axis that, itself, is parallel to the Y-axis. The X-axis and the Y-axis are perpendicular to one another, as indicated on FIG. 10. Note that, with respect to the structure of the tools in the various illustrated embodiments, the orientation of the X-axis, the Y-axis, and the Z-axis are the same for every embodiment disclosed herein.

It will be understood that the X-axis on FIG. 10 extends along a line that is substantially perpendicular to the longitudinal axis of the power tool 5, in which the linear movement of the driver 90 along its driver track essentially defines that longitudinal axis. The Y-axis on FIG. 10 is substantially parallel to that same longitudinal axis of the power tool 5. Therefore, the X- and Y-axes are perpendicular to one another.

It will be further understood that the Z-axis on FIG. 9 is also perpendicular to the X-axis, as noted above, and moreover, the Z-axis is also perpendicular to the Y-axis, thereby creating a 3-dimensional orthogonal system for describing certain features of the fastener driving tool 5. One of those features is the orientation of the rotational axis of the lifter 86, the rotational axis of the main shafts of the gearbox (within the lifter), and the rotational axis of the motors 20 and 30. In this embodiment, as shown on FIGS. 9 and 10, those rotational axes are all substantially parallel to the Z-axis. (In this embodiment on FIGS. 9 and 10, those rotational axes are also co-linear.)

Figure 13:
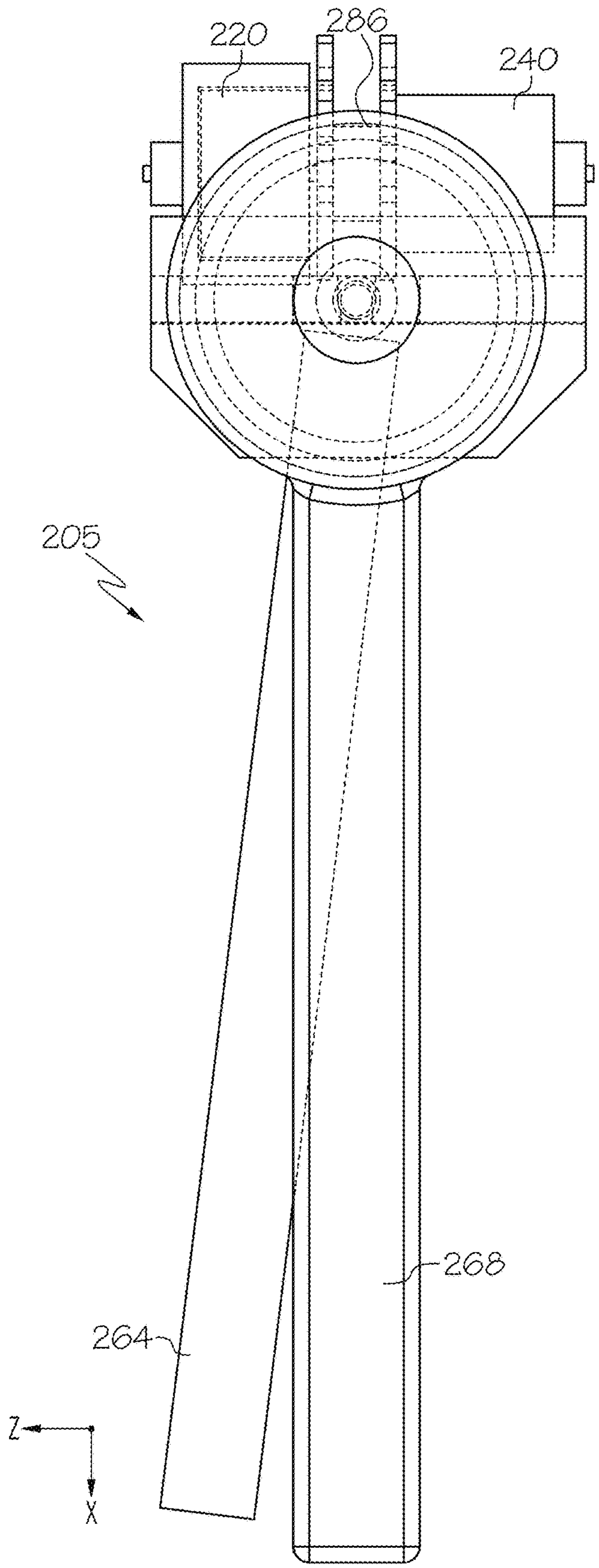
FIG. 13 is a top, elevational view in partial cut-away of the tool without the tool's outer housing, and the first alternative lifter subassembly of FIG. 11.

Some of the other specific features of the fastener driving tool 5 are as follows: the axis of rotation of the gearbox output shaft 80 is substantially parallel to the Z-axis; the axis of rotation of the lifter rotor 86 is substantially parallel to the Z-axis; also, the motors 20 and 30 are positioned on a first side of the driver (i.e., above the driver in FIG. 9), whereas the trigger handle 68 is positioned on a second, opposite side of the driver (i.e., below the driver in FIG. 9). This last feature is also true for those embodiments that have only a single motor—i.e., motor 220 in FIG. 13 is on the opposite side of the driver than the trigger handle 268.

It will also be understood that the trigger handle 68 that is illustrated in FIG. 10 is depicted as extending along the X-axis, but this view is showing a generic trigger handle, whereas a trigger handle made for an actual power tool most likely would be extending at a somewhat different angle that is more ergonomically pleasing to the user. On the other hand, the trigger handle in FIG. 10 is illustrated as extending along a line that is within a plane formed by the X-axis and the Y-axis, which is typical for power tools; even a more ergonomically pleasing angle for the trigger handle typically would still fall within that same X-axis/Y-axis plane.

Second Embodiment

Referring now to FIGS. 11-15, a first alternative embodiment lifter main drive subassembly (or "lifter drive S/A") 210 includes a single motor 220 on one side of a lifter rotor 286 (also sometimes referred to herein as a "lifter hub"), and a gearbox 240 on the opposite side of that lifter rotor. An output shaft of the motor 220 drives into the gearbox 240 and, as in the first embodiment, this could be a common shaft that also acts as the gearbox input shaft. After a gear ratio reduction, the gearbox 240 includes an output shaft (hollow) that drives the lifter rotor 286. The lifter rotor is again provided with multiple protrusions 282 that engage extensions on a driver 290, so as to have the ability to "lift" that driver during a lifting stroke.

This first alternative embodiment is also a very compact design, and eliminates the need for an elongated motor housing that is found on the current generation of FUSION-type fastener driving tools. The sharing of the motor output shaft as the gearbox input shaft saves space as a first aspect, and the centrally-located positioning of both the motor 220 and the gearbox 240 around the lifter rotor 286 is a second aspect of space-saving.

In this alternative embodiment, the axis of rotation of the gearbox input shaft is in a transverse direction with respect to the longitudinal axis of movement of the driver 290. Furthermore, the physical position of the gearbox 240 is such that an axis of rotation of the lifter rotor 286 is parallel to the gearbox input shaft. It should be noted that the axis of rotation of the lifter rotor 286 could be co-linear with the gearbox input shaft, however, this is not a requirement.

Again referring to FIGS. 11, 12, and 13, a first alternative tool 205 is illustrated, including a working cylinder 270, a piston 272 and the driver 290, the motor 220, the gearbox 240, and the lifter hub 286 sandwiched between the motor and the gearbox, a guide body 250 (also sometimes referred to herein as a "base"), a trigger handle 268, a fastener magazine 264, and an exit end 266 of the tool. During operation of the tool 205, the piston 272 and the driver 290 reciprocate from the top of the working cylinder 270 towards a bumper 260, and this reciprocating travel motion is the longitudinal movement of the driver 290, as discussed above. In FIG. 13, the magazine 264 is depicted at a slight angle as compared to the trigger handle 268, and the motor 220, the lifter hub 286, and the gearbox 240 are positioned above the guide body 250 (in this view).

Figure 14:
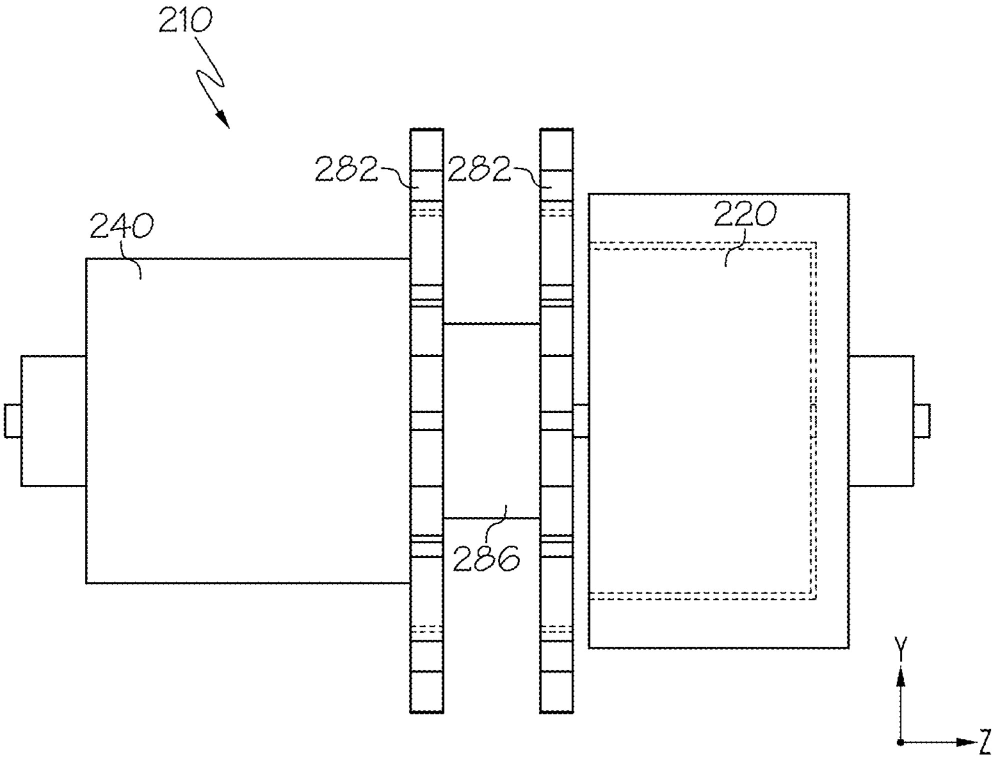
FIG. 14 is a front, elevational view in partial cut-away of the first alternative lifter subassembly of FIG. 11.

Referring now to FIG. 14, an enlarged view of the lifter driver S/A 210 is illustrated, depicting the gearbox 240 on the left (in this view) and the motor 220 on the right (in this view). Positioned between the gearbox and the motor is the lifter hub 286, exhibiting a plurality of protrusions 282. As noted above, during a lifting stroke, the protrusions 282 sequentially contact and "lift"extensions on the driver 290.

Figure 15:
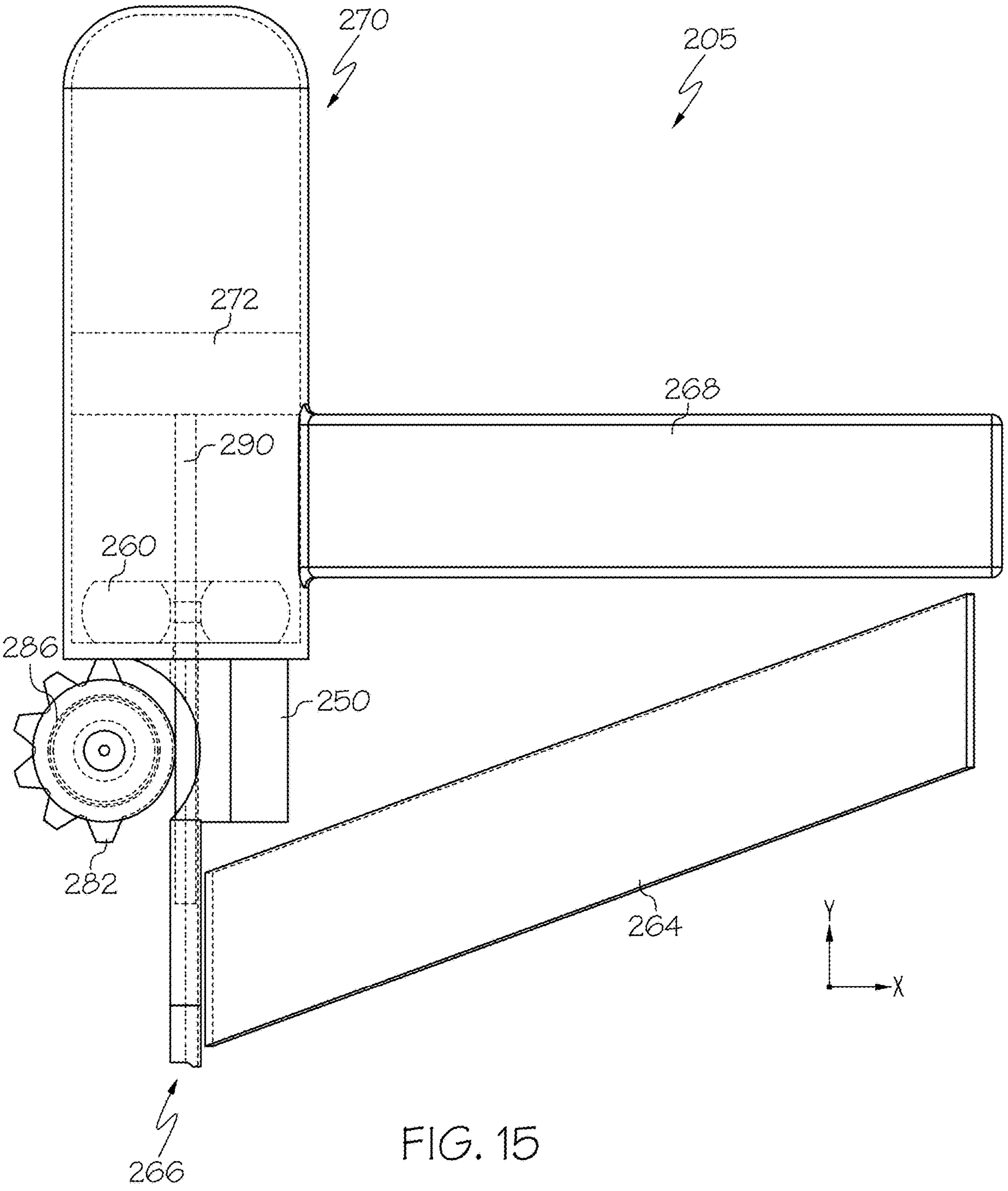
FIG. 15 is a left-side elevational view in partial cut-away of the tool without the tool's outer housing or pressure chamber, and the first alternative lifter subassembly of FIG. 11.
Figure 16:
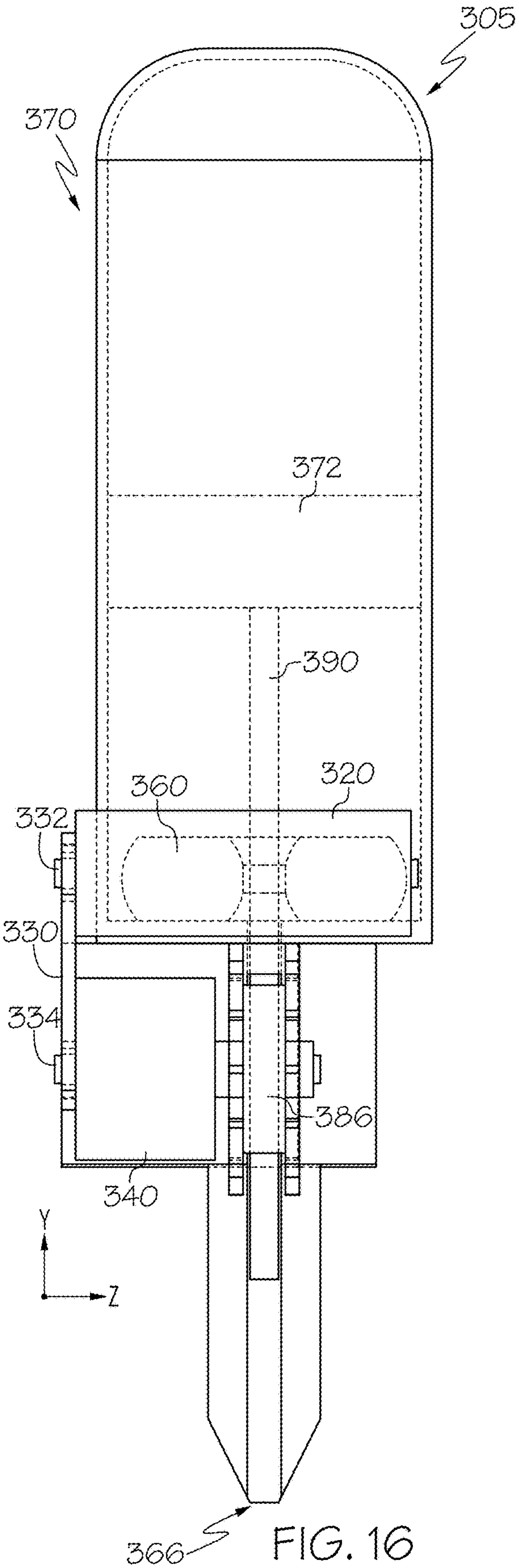
FIG. 16 is a front, elevational view showing a fastener driving tool without the tool's outer housing, with a second alternative embodiment lifter subassembly, and not showing the magazine and the trigger handle for clarity.
Figure 17:
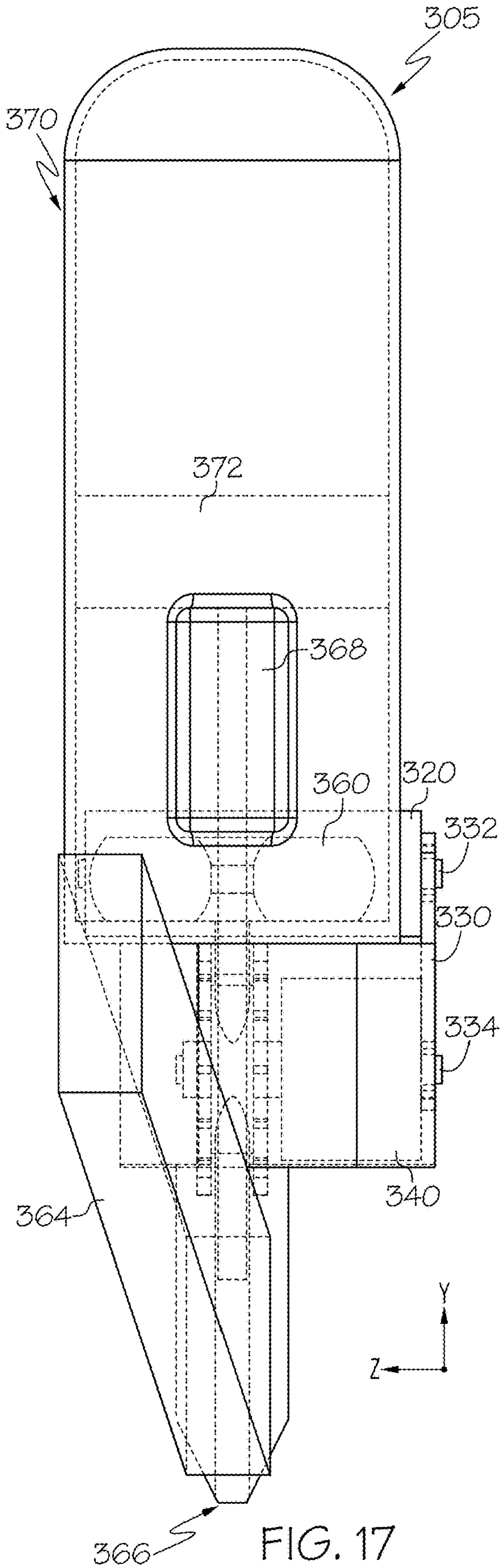
FIG. 17 is a rear, elevational view of the tool without the tool's outer housing, and the second alternative lifter subassembly of FIG. 16.

Referring now to FIG. 15, the protrusions 282 are depicted projecting outward from the lifter hub 286. In FIG. 15 the lifter hub 286 and the protrusions 282 are clearly visible.

Figure 31:
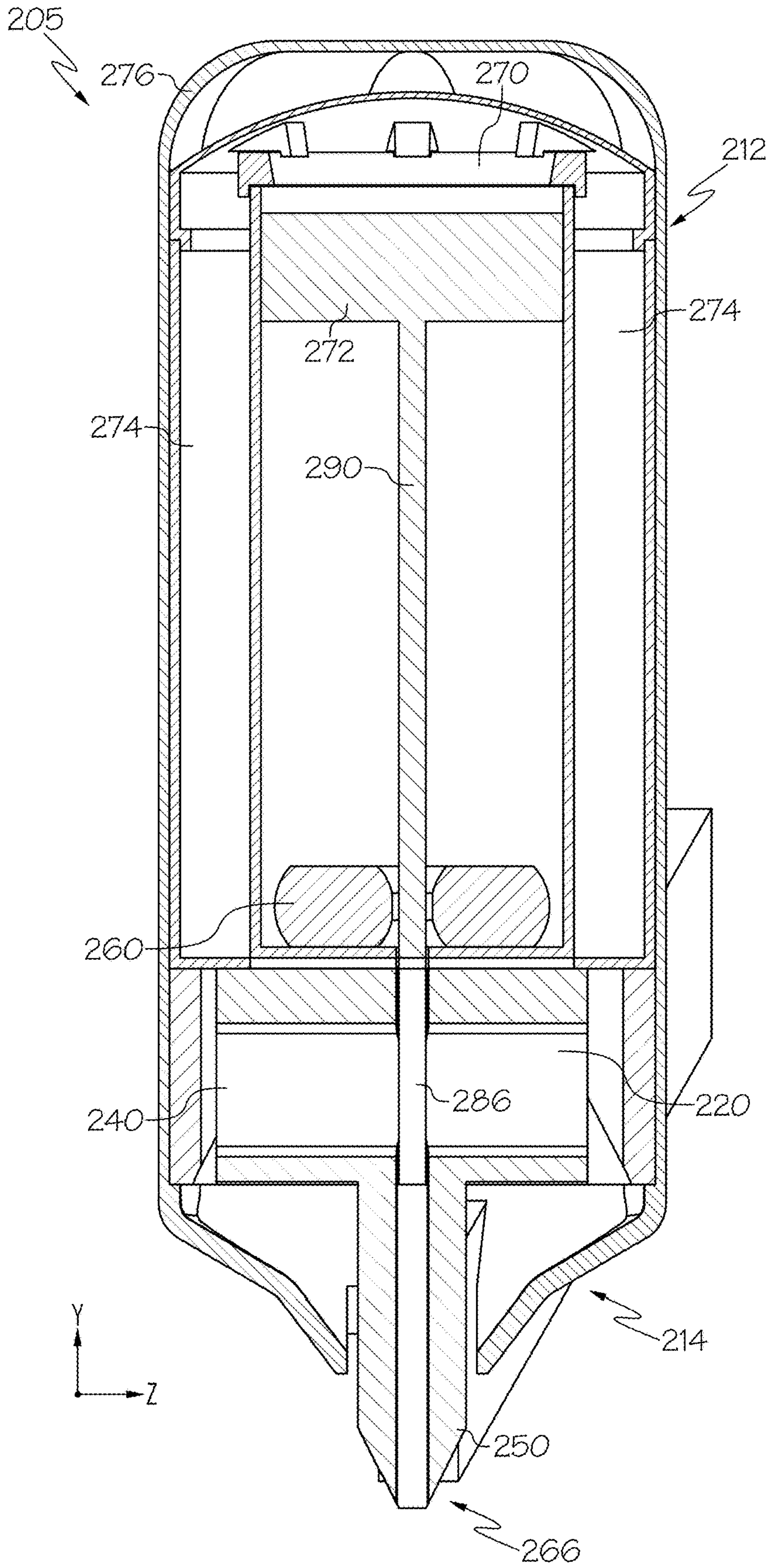
FIG. 31 is a front cutaway view of the first alternative embodiment lifter subassembly.

Referring now to FIG. 31, the first alternative embodiment lifter subassembly 210 is again depicted, and includes an outer housing 212 that at least partially covers the working cylinder 270, a pressurized storage chamber 274, the piston 272, the driver 290, and the piston stop 260. A front housing 214 at least partially covers the gearbox 240, the motor 220, the lifter hub 286, and the guide body 250. The exit end 266 protrudes out of the front housing 214. An end cap 276 is positioned at the top of the outer housing 212, at an opposite end from the exit end 266.

It will be understood that the tool 205 illustrated in FIG. 31 is designed to operate on the principles of the FUSION® product line of fastener driving tools sold by Senco (originally Senco Products, Inc., later Senco Brands, Inc., and now Kyocera Senco Industrial Tools, Inc.), which means that the storage chamber 274 is always under pressure, once the complete tool has been assembled. A pressurized gas is introduced into the storage chamber 274, and this gas is not vented to atmosphere during or after a driving stoke, but instead remains in the storage chamber 274 at all times, including during a lifting stroke of the piston 272. Moreover, the area (or volume) "above" the piston—where the reference numeral 270 is pointing—is always in fluidic communication with the storage chamber 274, which means that this volume "above" the piston is also always under pressure, including during a lifting stroke, which is the reason why the lifter S/A must be robust. Finally, it will also be understood that the area (or volume) "below" the piston—i.e., where the driver 290 resides—is not under pressure; instead, it is vented to atmosphere, so as to maintain minimum air flow resistance "below"the piston during a driving stroke.

Figure 32:
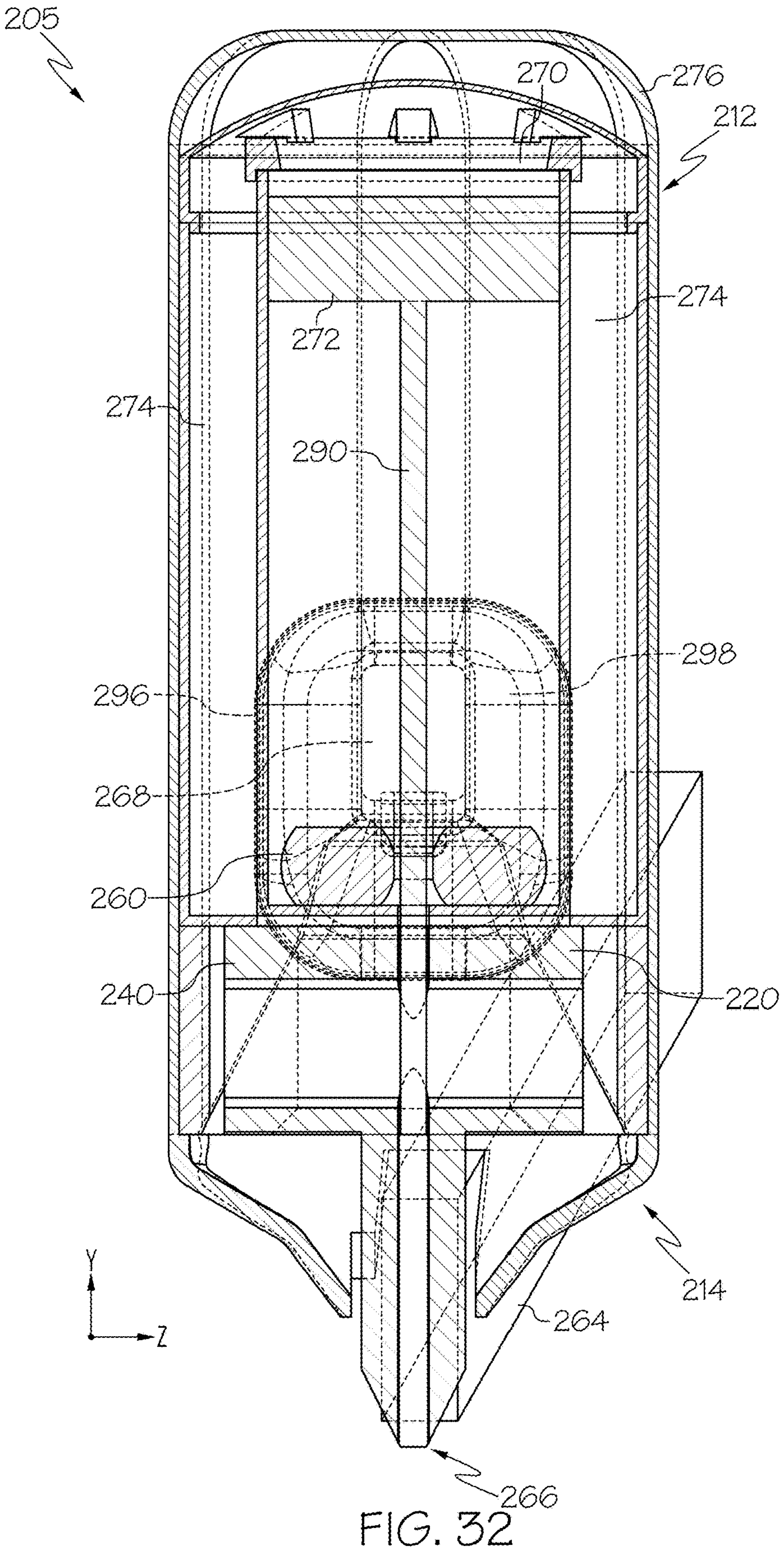
FIG. 32 is a front cutaway view of the first alternative embodiment lifter subassembly, showing a trigger handle and a battery adapter in dashed lines.

Referring now to FIG. 32, the tool 205 having the first alternative embodiment lifter subassembly 210 is depicted as including a battery adapter 298, a battery 296, and the trigger handle 268 all in dashed lines behind (in this view) the working cylinder 270. The battery adapter 298 is configured so that the battery 296 can be connected to provide electrical power to the tool 205, and then disconnected when the battery 296 needs recharging.

Figure 33:
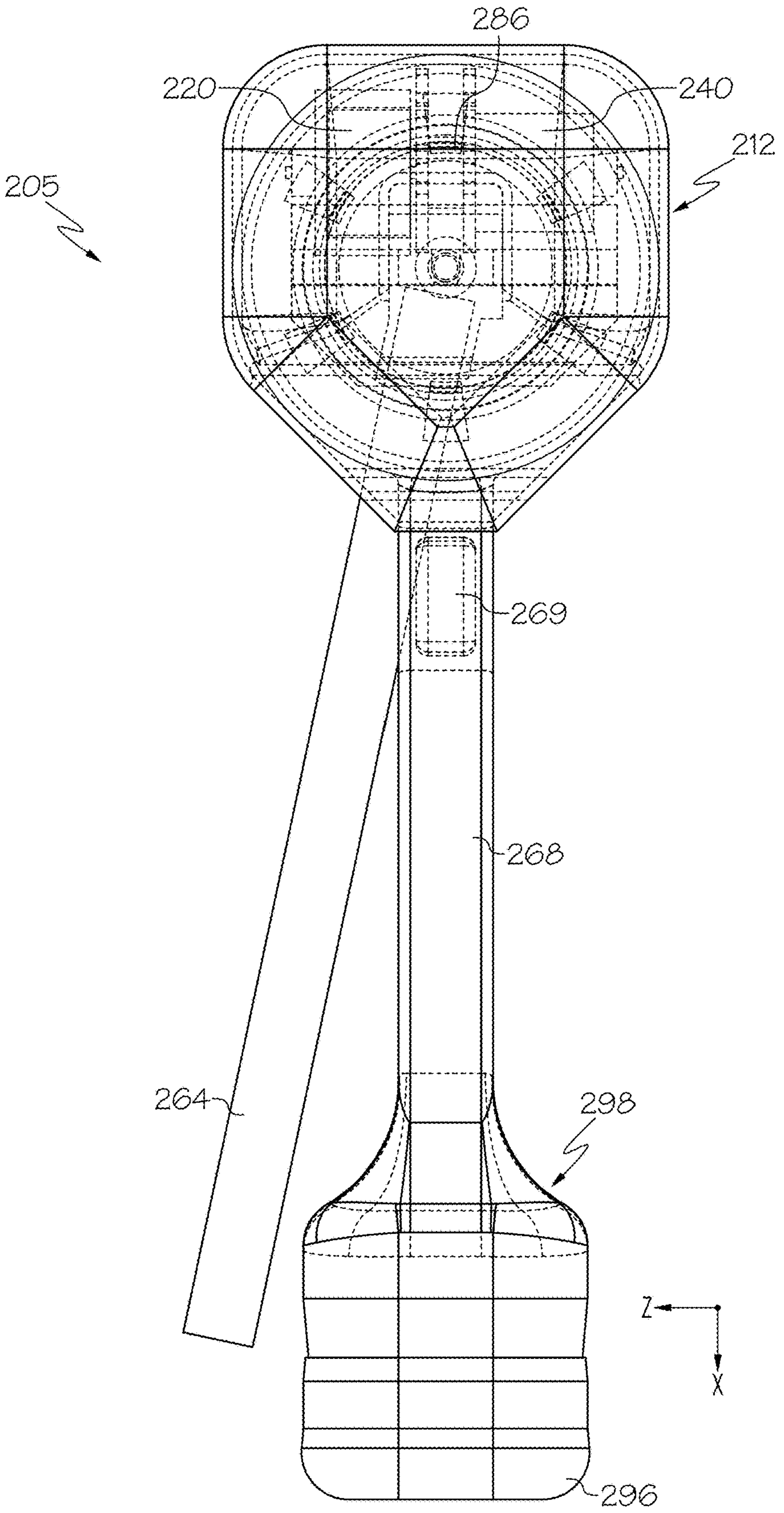
FIG. 33 is a top, elevational view of the first alternative embodiment lifter subassembly.

Referring now to FIG. 33, the battery adapter 298 of tool 205 is preferably positioned at the base of the trigger handle 268. A user-operated trigger 269 is used to activate the motor 220 by drawing electrical current from the battery 296. However, the trigger 269 will not actuate the motor 220 unless a safety contact element (not shown in this view) of the tool 205 is pressed against a workpiece.

Figure 34:
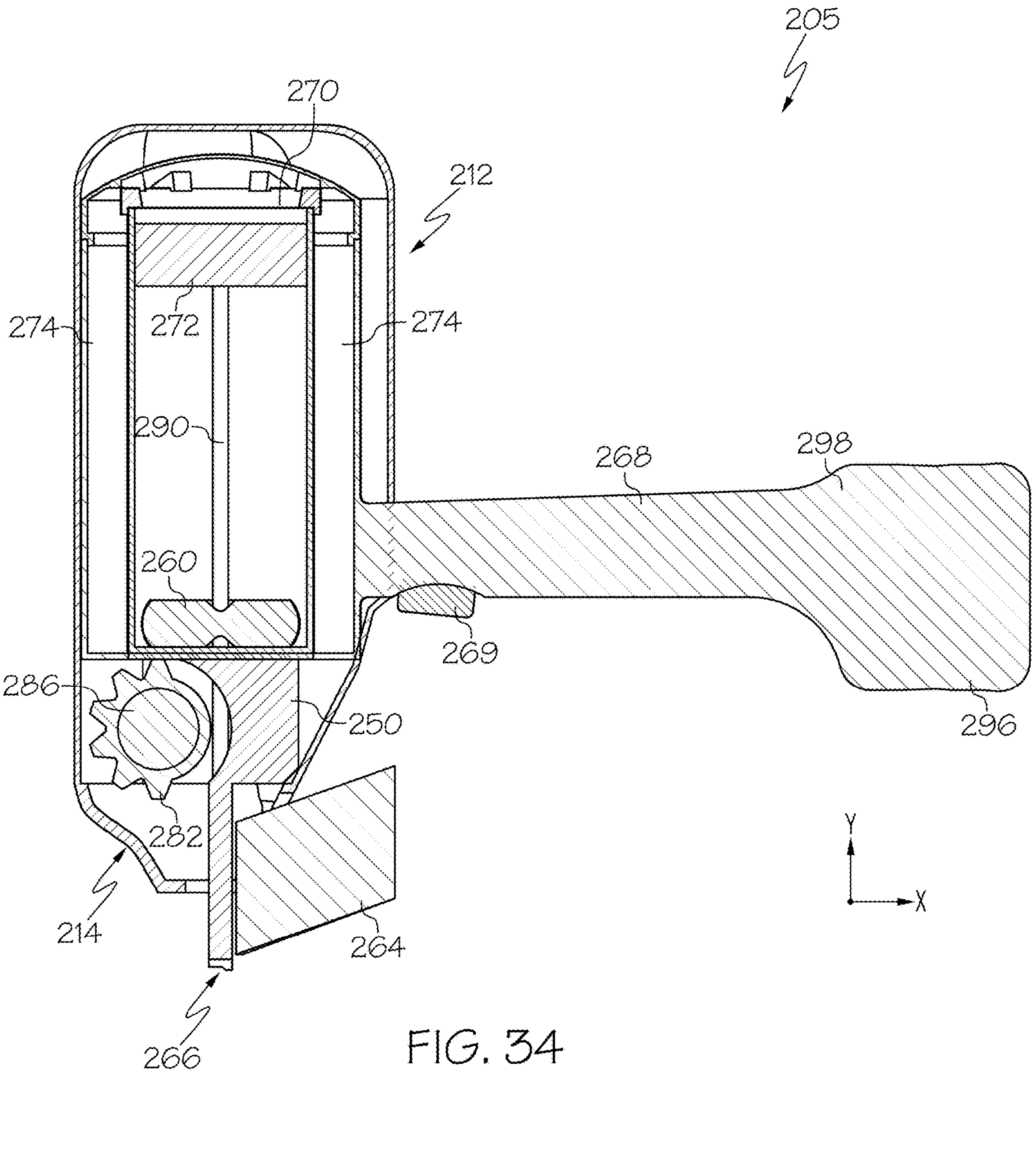
FIG. 34 is a left side cutaway view of the first alternative embodiment lifter subassembly.

Referring now to FIG. 34, the tool 205 is depicted with its piston at the ready position, in which the piston 272 and the driver 290 are ready to begin a driving stroke. The lifter hub 286 has a plurality of protrusions 282 that contact the plurality of extensions on the driver 290 during a return stroke. It will be noted that the magnitude of the pressurized gas inside the pressure chamber (i.e., storage chamber 274) is at a high value when the piston is at this illustrated position, which means that the magnitude of the gas "above" the piston (at the location depicted by reference numeral 270) is also at a high value.

It will be understood that the pressurized gas magnitude will somewhat decrease as the piston 272 travels through its driving stroke and impacts against the piston stop 260, but the pressure at that moment of the tool's operation will still be sufficiently high in magnitude to properly drive a fastener into its target workpiece, under normal operating conditions. As the piston moves downward (in this view) during a driving stroke, the volume of gas "above" the piston will increase within the working cylinder at 270; this variable volume is referred to as the "variable displacement volume." The volume "below" the piston within the working cylinder will, correspondingly, decrease during a driving stroke, which is referred to as the "variable venting volume." Since the volume "below" the piston is vented to atmosphere, its pressure is effectively constant at all times during the tool's normal operation (i.e., at zero PSIG).

It will also be understood that many of the drawings associated with this patent application are somewhat "idealized," in that they include the working cylinder, but they do not include the pressure chamber (the "storage chamber"). This statement applies to FIGS. 7-10, 11-13, 15, 16-18, 20, 21-24, and 26-29. The drawing views of FIG. 6, and 31-34 are of the opposite sense, in that they do include the pressure chamber (or "storage chamber"); and note that all of these views (i.e., FIGS. 11-15 and FIGS. 31-34) are of the same (second) embodiment. It will be understood that the other embodiments described herein will also include a similar pressure chamber (or "storage chamber") in a complete tool, even though the pressure chamber is not depicted in most of those views. Finally, it will be further understood that the pressure chamber does not need to be positioned exactly as shown in the views of FIGS. 31-34; however, this arrangement as shown provides for a very compact tool.

Third Embodiment

Referring now to FIGS. 16-20, a second alternative embodiment lifter main drive subassembly (or "or lifter drive S/A") 310 places a gearbox 340 to one side of a lifter rotor 386 (also sometimes referred to herein a "lifter hub"), in a similar manner to that described above for the first alternative embodiment 210. In this new embodiment, a motor 320 is placed at a spaced-apart distance just above the lifter rotor 386, in which a motor output shaft 326 is located on the same side of that lifter rotor. A first pulley 332 is mounted to the output shaft 326 of the motor 320, and a second pulley 334 is mounted to an input shaft 342 of the gearbox 340. A flexible drive belt 330 is placed over these two pulleys 332, 334, thereby enabling the motor 320 to drive the input shaft 342 of the gearbox 340. After creating a gear ratio reduction, the gearbox 340 has an output shaft 380 that engages the lifter rotor 386, and the lifter rotor again includes multiple protrusions 382 for engaging the extensions 392 on a driver 390, thereby enabling the lifter rotor to move the driver during a lifting stroke.

Figure 18:
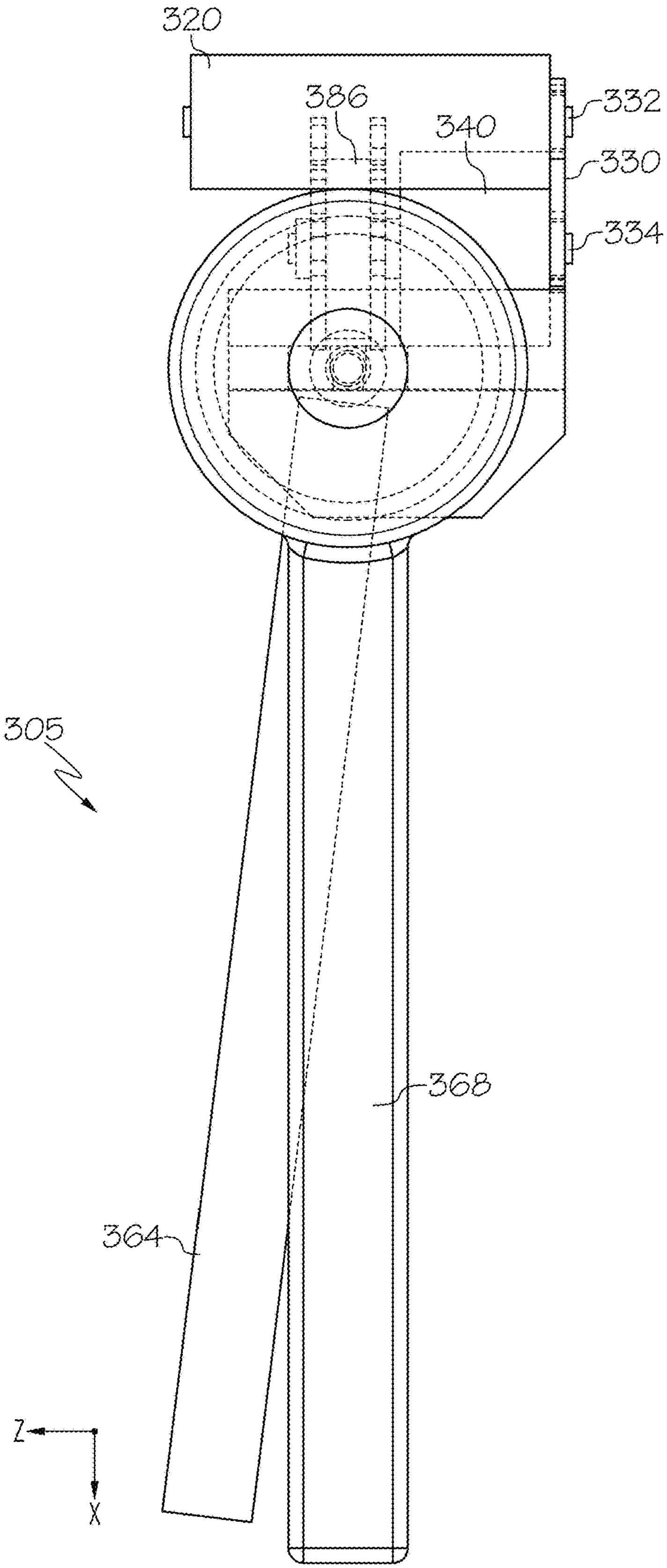
FIG. 18 is a top, elevational view of the tool without the tool's outer housing, and the second alternative lifter subassembly of FIG. 16.

Again referring to FIGS. 16, 17, and 18, a second alternative tool 305 is illustrated, including a working cylinder 370, a piston 372 and the driver 390, a trigger handle 368, a fastener magazine 364, and an exit end 366. During operation of the tool, the piston 372 and the driver 390 reciprocate from the top of the working cylinder 370 towards a bumper 360, and this reciprocating travel motion is the longitudinal movement of the driver 390. In FIG. 18, the magazine 364 is positioned at a slight angle compared to the trigger handle 368, and the motor 320 is positioned "above"the gearbox 340 (in this view).

Figure 19:
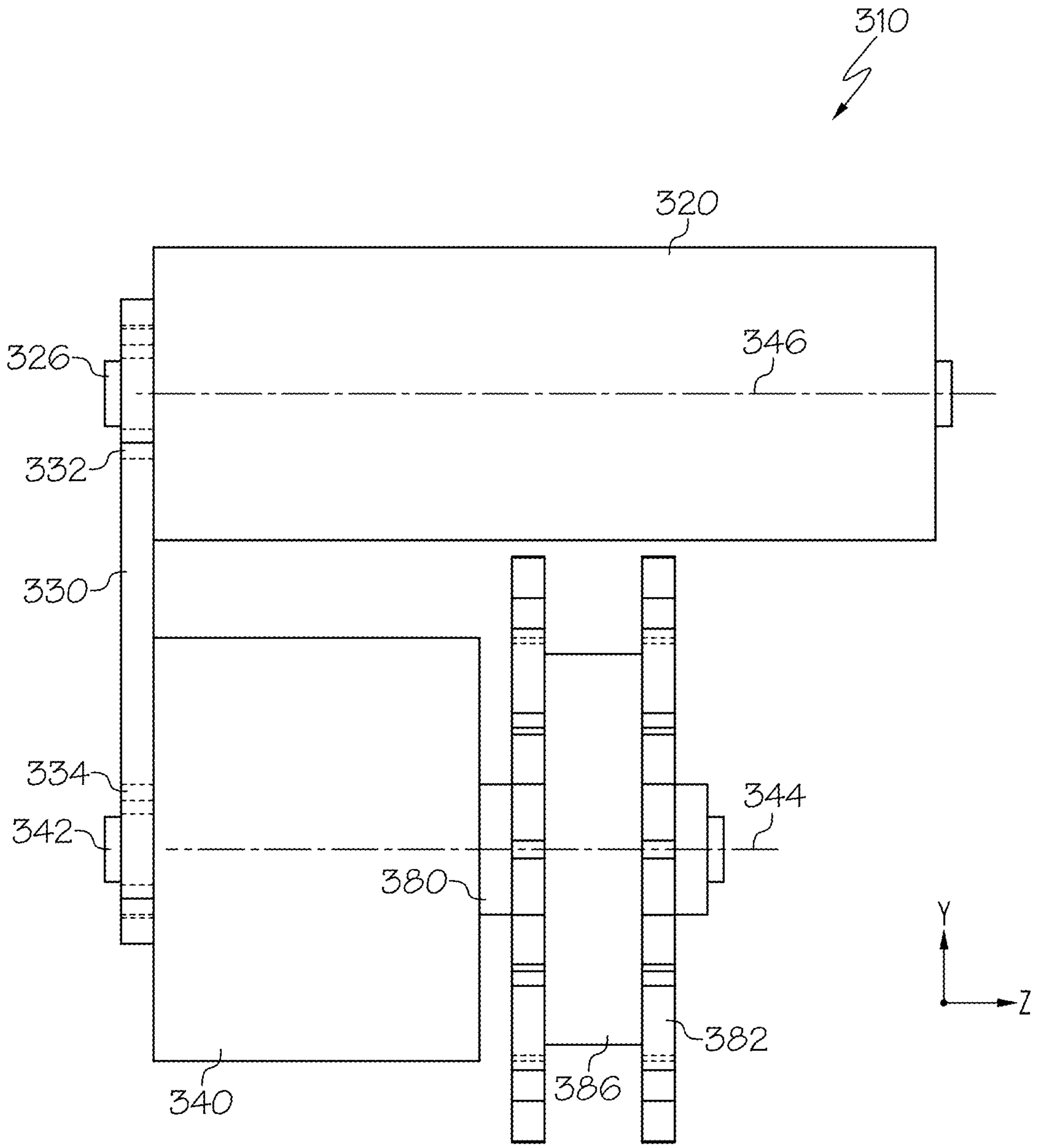
FIG. 19 is a front, elevational view of the second alternative lifter subassembly of FIG. 11.

Referring now to FIG. 19, an enlarged view of the motor 320 and the gearbox 340 are illustrated. In this second alternative embodiment, the lifter hub 386 is positioned in front of the motor 320, opposite the pulleys 332, 334 (in this view). It should be noted that a first spatial line 344 formed by the rotational axis of the gearbox input shaft 342 is essentially parallel to a second spatial line 346 that is formed by a rotational axis of the motor output shaft 326.

Figure 20:
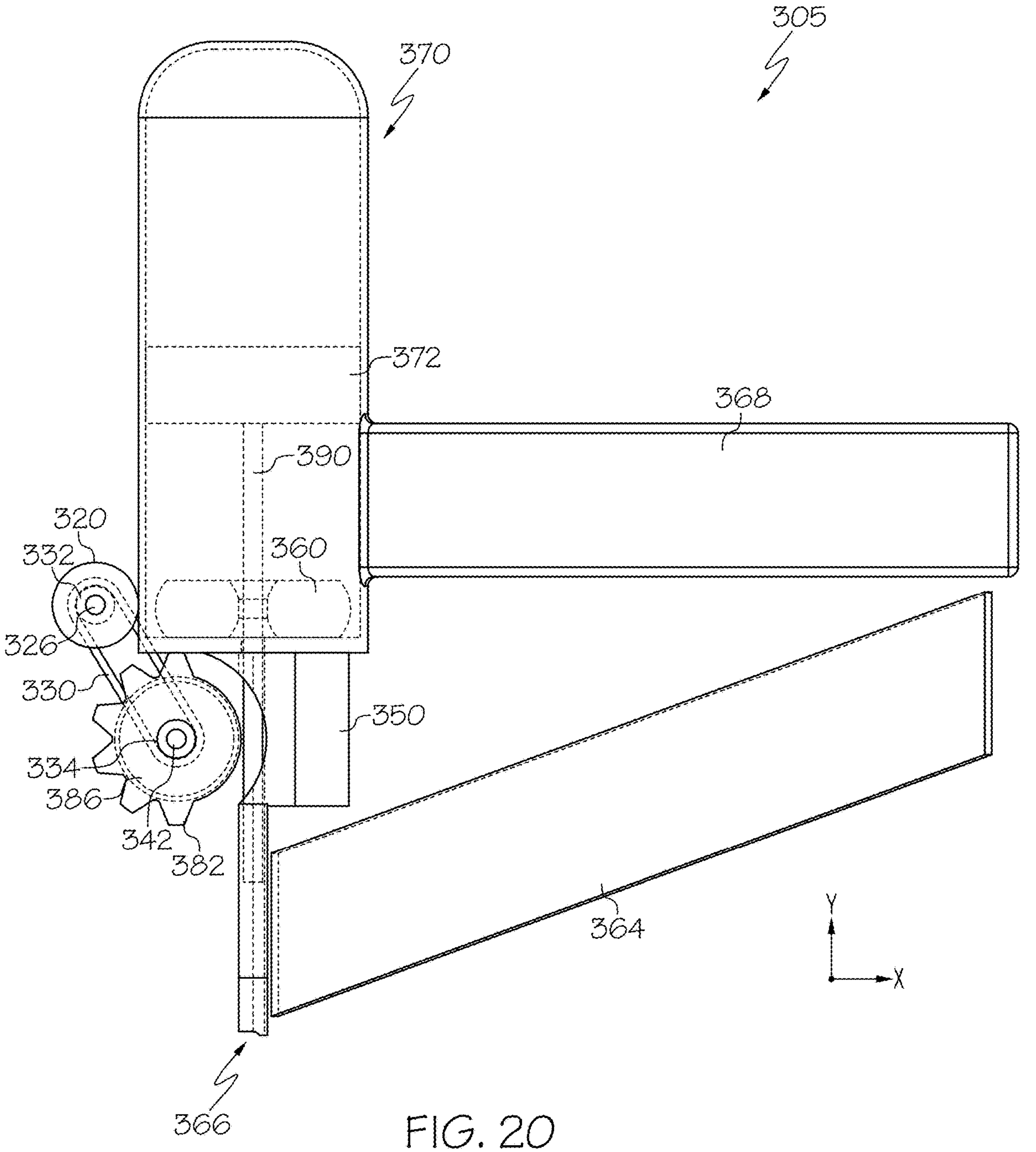
FIG. 20 is a left-side elevational view of the tool without the tool's outer housing, and the second alternative lifter subassembly of FIG. 16.
Figure 21:
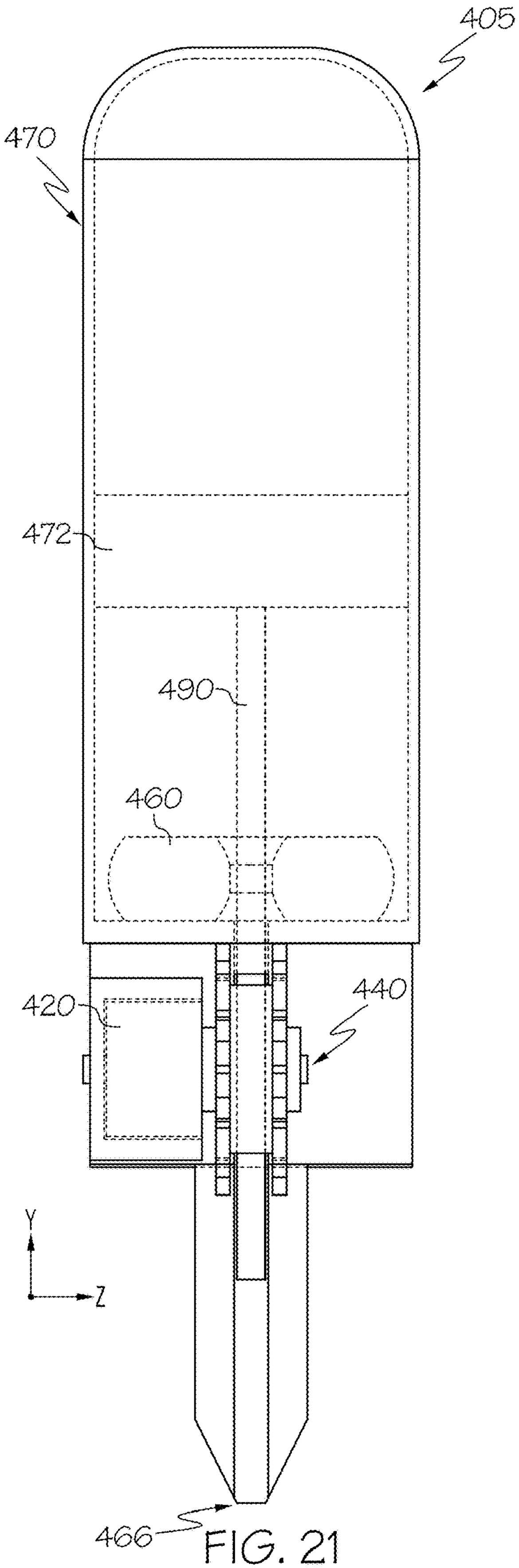
FIG. 21 is a front, elevational view showing a fastener driving tool without the tool's outer housing, with a third alternative embodiment lifter subassembly, and not showing the magazine and the trigger handle for clarity.
Figure 22:
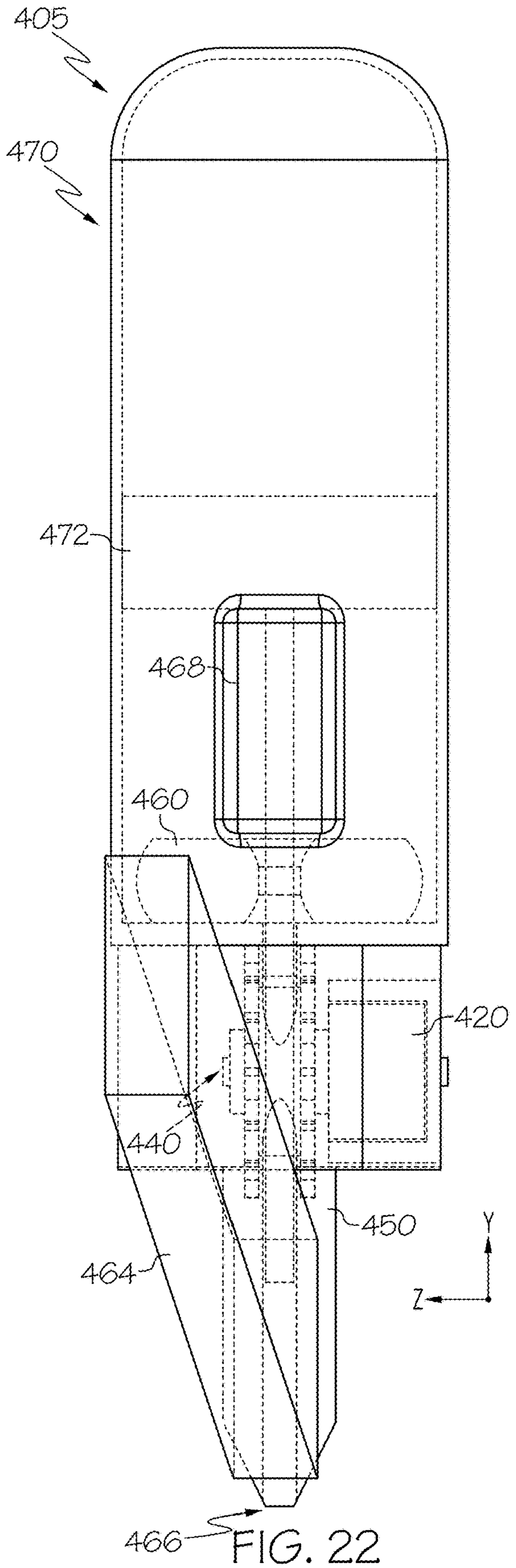
FIG. 22 is a rear, elevational view of the tool without the tool's outer housing, and the third alternative lifter subassembly of FIG. 21.

Referring now to FIG. 20, the first and second pulleys 332, 334 are depicted, along with the flexible drive belt 330, and the motor 320. The plurality of protrusions 382 are illustrated projecting outwards from the lifter hub 386. It should be noted that the drive belt 330 could instead be a chain drive.

Fourth Embodiment

Referring now to FIGS. 21-25, a third alternative embodiment lifter main drive subassembly (or "or lifter drive S/A") 410 places a gearbox 440 at a centrally-located position within an open space 484 created by a lifter rotor 486 (also sometimes referred to herein as a "lifter hub"). A motor 420 is positioned to one side of the lifter/gearbox position, but in this embodiment a motor output shaft 426 is co-linear with a gearbox input shaft.

With the gearbox 440 being positioned within the lifter rotor's open central space 484, the gearbox input shaft extends through a hollow central portion of the gearbox output shaft, in an orientation in which the gearbox input and output shafts are co-linear (i.e., concentric). In addition, with the gearbox 440 being physically positioned within the open space 484 formed by the lifter rotor 486, the axis of rotation of the lifter rotor is co-linear with the gearbox input shaft. This is quite similar to the gearbox configuration 40, illustrated in FIGS. 1-2, i.e., the twin motor first embodiment, described above.

Figure 23:
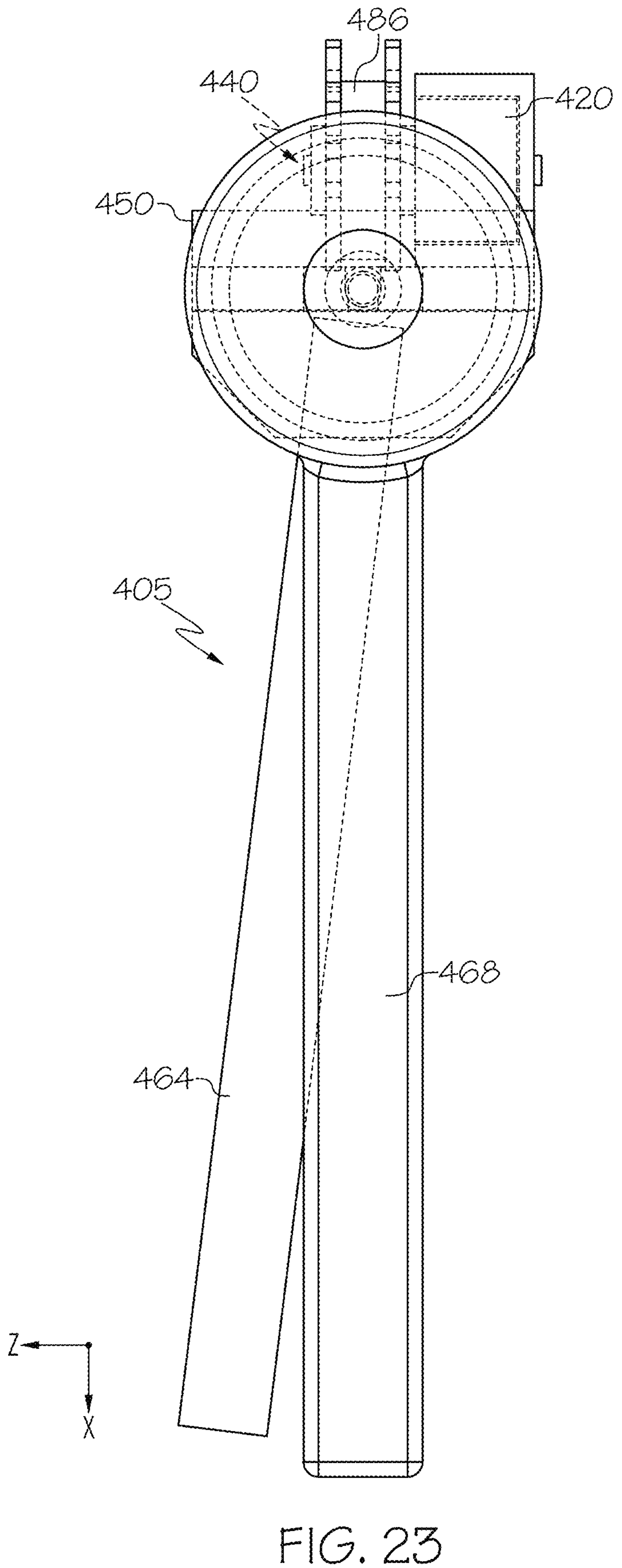
FIG. 23 is a top, elevational view of the tool without the tool's outer housing, and the third alternative lifter subassembly of FIG. 21.

Again referring to FIGS. 21, 22, and 23, a third alternative embodiment tool 405 is illustrated, including a working cylinder 470, a piston 472 and a driver 490, a trigger handle 468, a fastener magazine 464, and an exit end 466. During operation of the tool, the piston 472 and the driver 490 reciprocate from the top of the working cylinder 470 towards a bumper 460, and this reciprocating travel motion is the longitudinal movement of the driver 490. In FIG. 23, the magazine 464 is positioned at a slight angle compared to the trigger handle 468, and the motor 420 and the lifter hub 486 are positioned "above" a guide body 450 (in this view).

Figure 24:
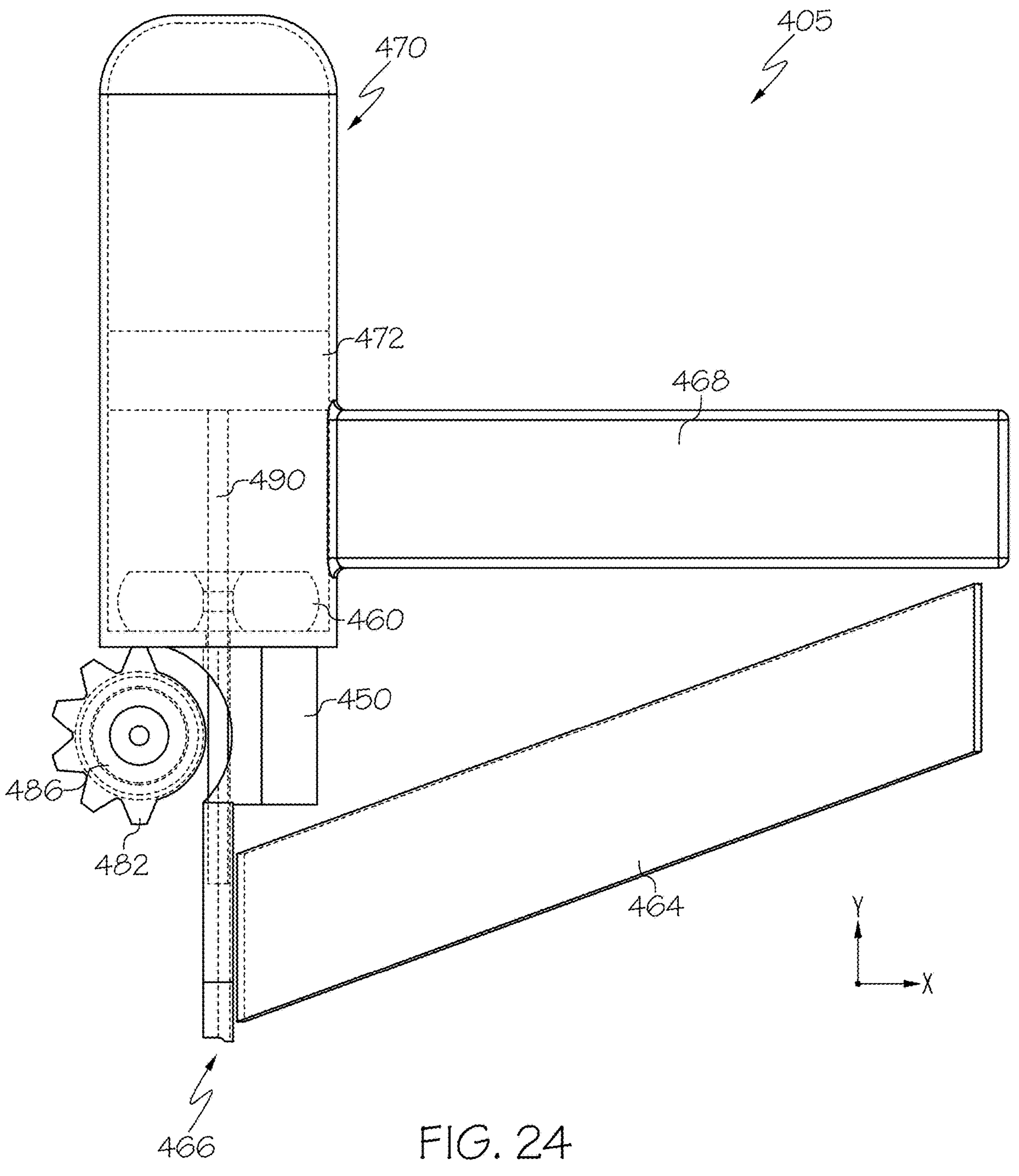
FIG. 24 is a left-side elevational view of the tool without the tool's outer housing, and the third alternative lifter subassembly of FIG. 21.
Figure 25:
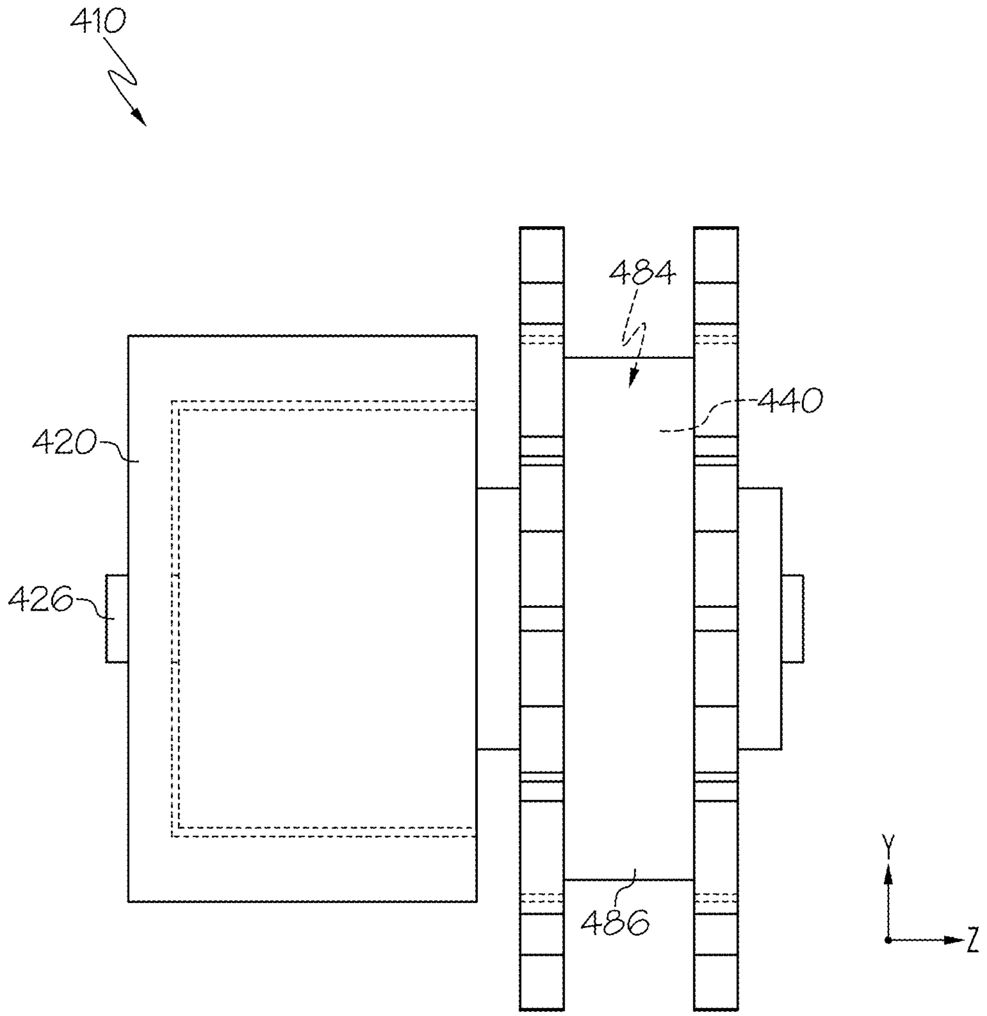
FIG. 25 is a front, elevational view of the third alternative lifter subassembly of FIG. 21.
Figure 26:
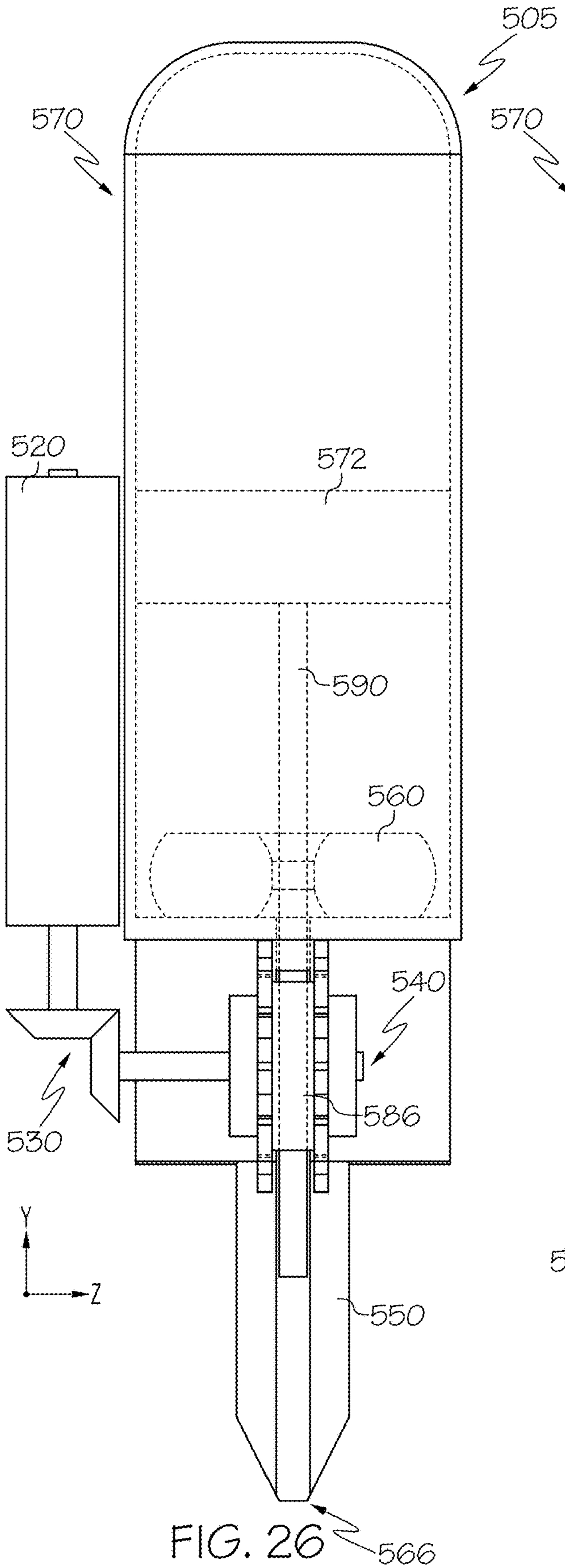
FIG. 26 is a front, elevational view showing a fastener driving tool without the tool's outer housing, with a fourth alternative embodiment lifter subassembly, and not showing the magazine and the trigger handle for clarity.
Figure 27:
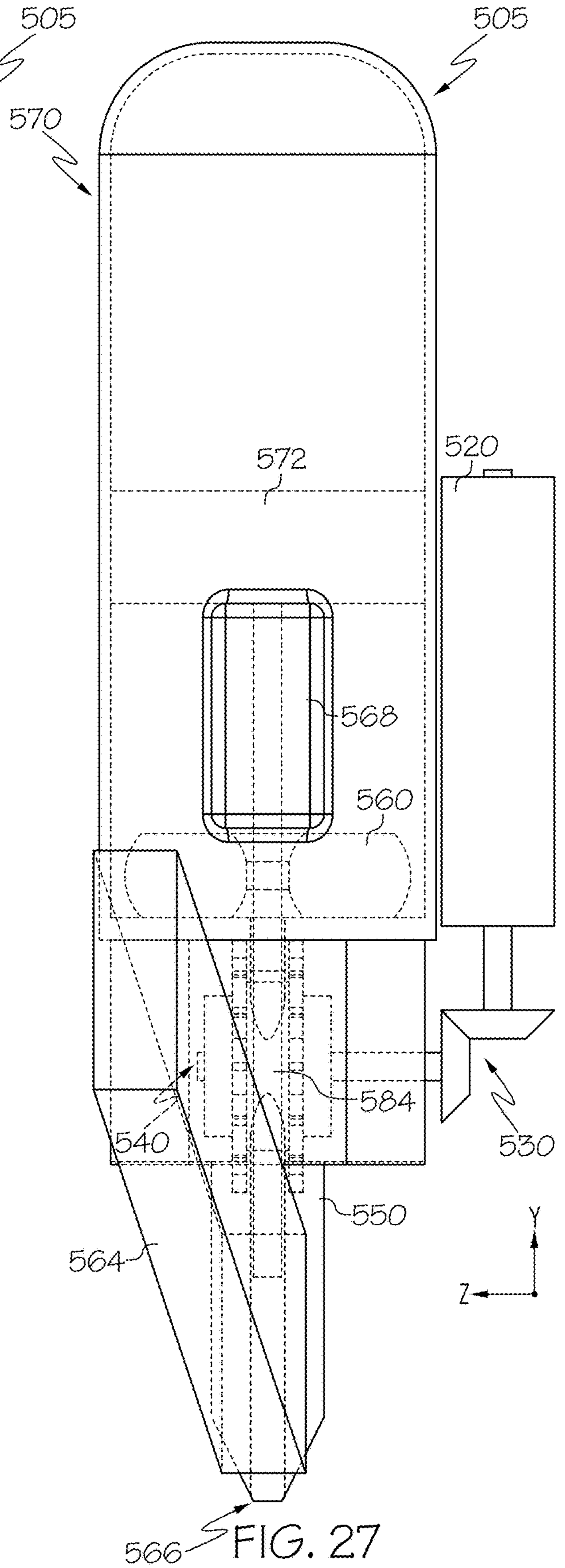
FIG. 27 is a rear, elevational view of the tool without the tool's outer housing, and the fourth alternative lifter subassembly of FIG. 26.

Referring now to FIG. 24, the lifter hub 486 is illustrated including a plurality of protrusions 482, and the motor 420 is not shown for clarity. It should be noted that this third alternative embodiment may use a single, more powerful motor 420 as compared to the two motors 20 and 30 in the first embodiment of FIGS. 1-10, if desired. Or, if a less powerful tool is desired for use with smaller fasteners, then the motor 420 would not necessarily need to be more powerful, as determined by the tool's system designer.

Fifth Embodiment

Figure 28:
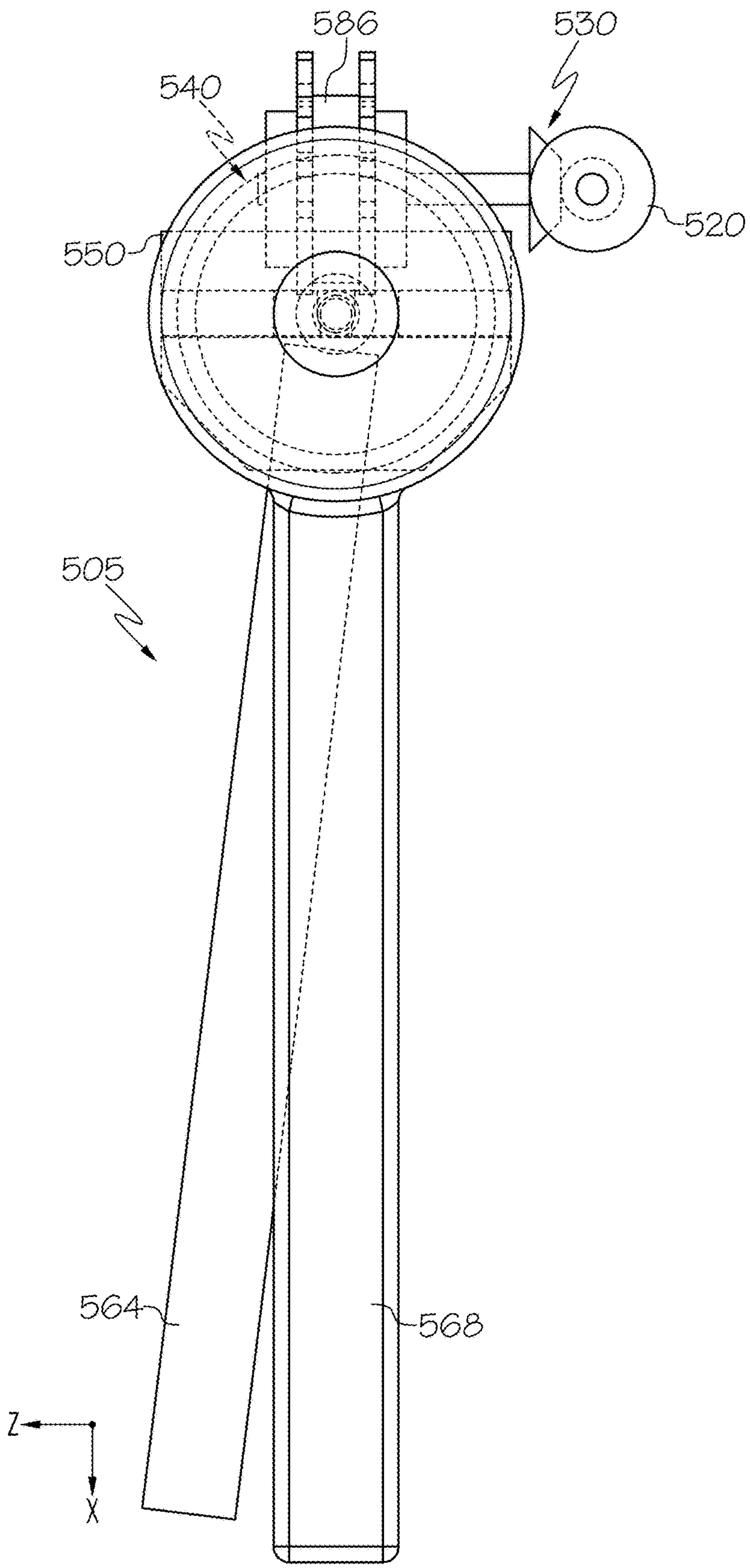
FIG. 28 is a top, elevational view of the tool without the tool's outer housing, and the fourth alternative lifter subassembly of FIG. 26.
Figure 29:
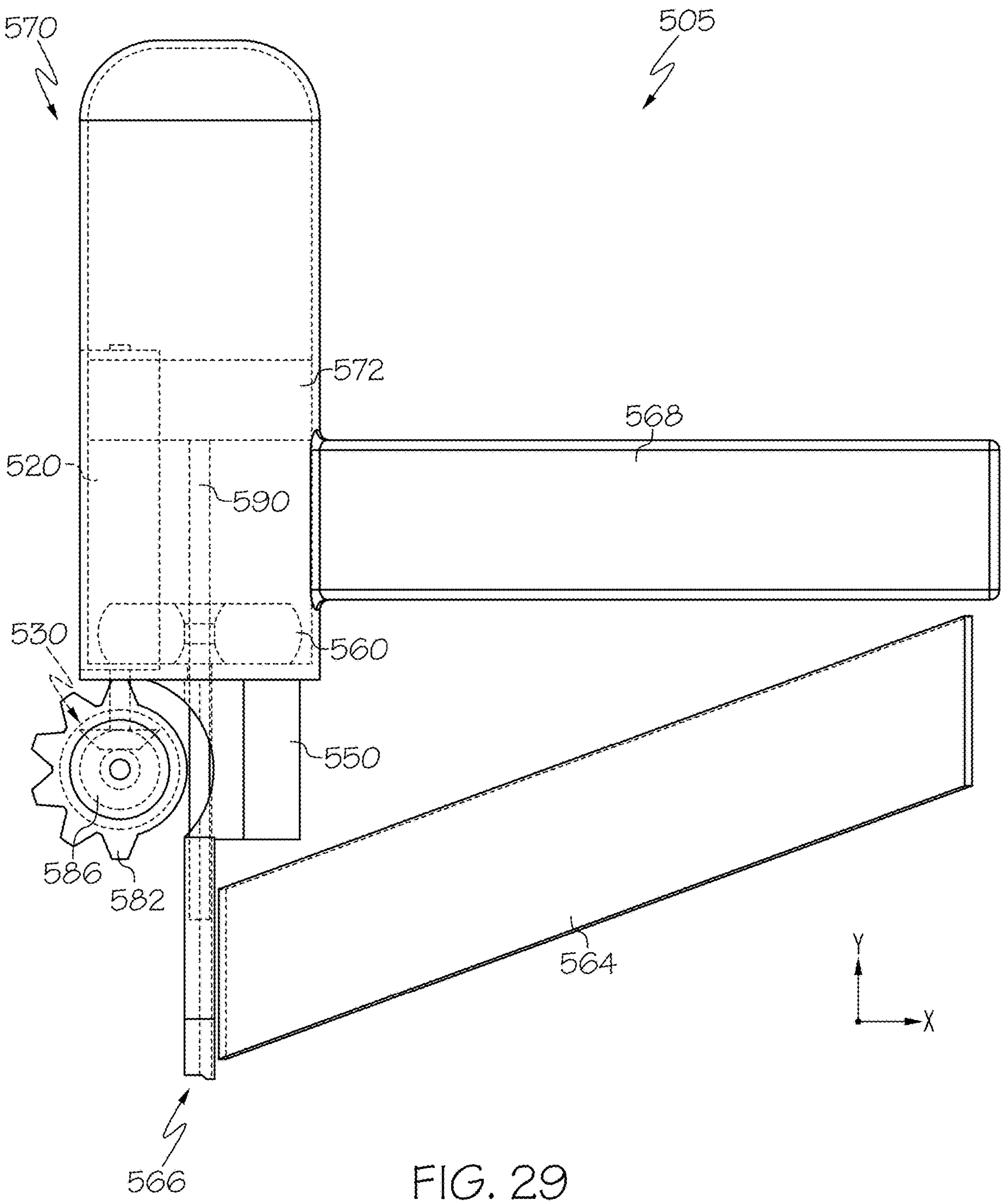
FIG. 29 is a left-side elevational view of the tool without the tool's outer housing, and the fourth alternative lifter subassembly of FIG. 26.
Figure 30:
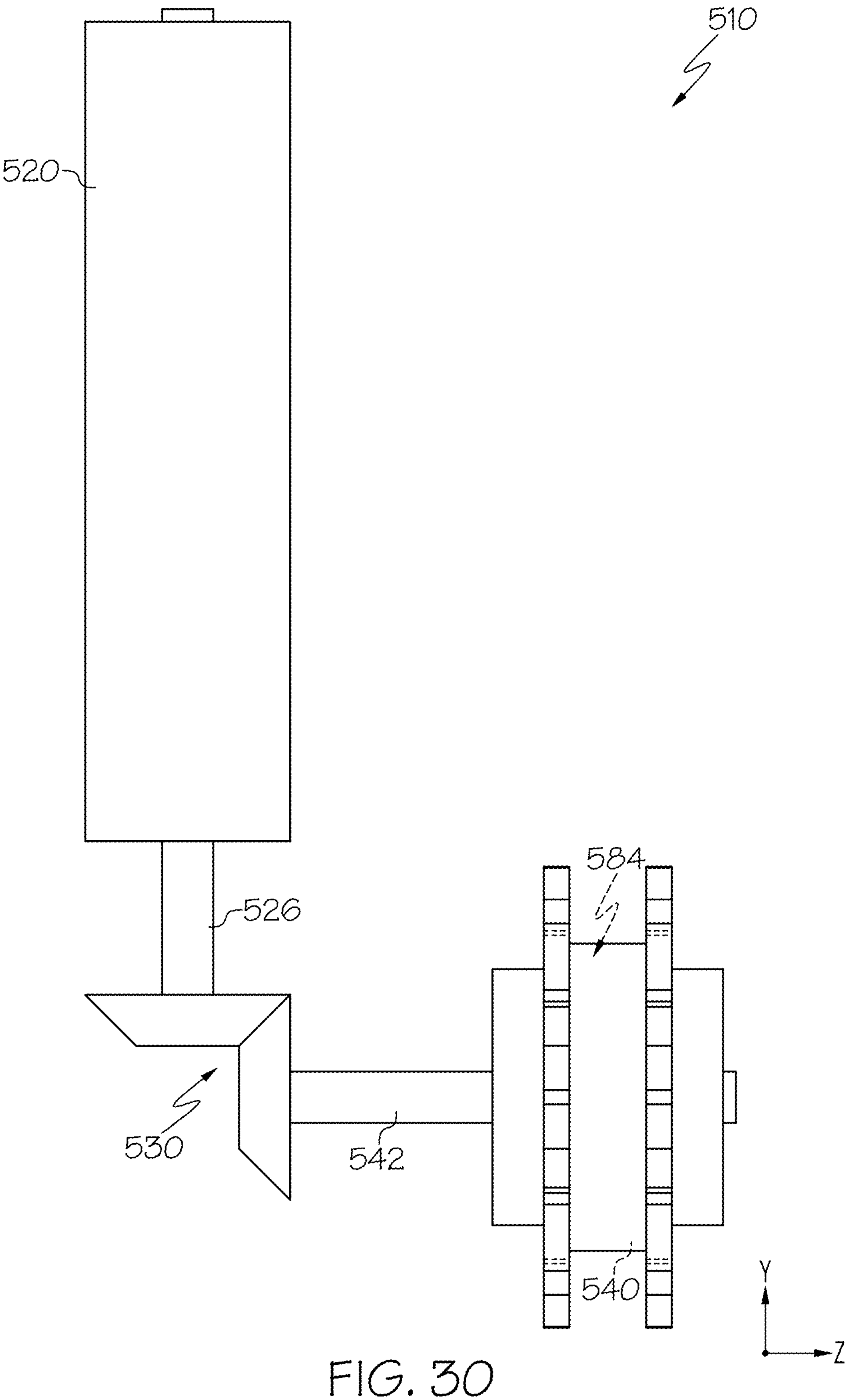
FIG. 30 is a front, elevational view of the fourth alternative lifter subassembly of FIG. 26.

Referring now to FIGS. 26-30, a fourth alternative embodiment lifter main drive subassembly (or "or lifter drive S/A") 510 places a (second) gearbox 540 at a centrally-located position within an open space 584 created by a lifter rotor 586 (also sometimes referred to herein as a "lifter hub"). A motor 520 is positioned to one side of the lifter/gearbox position, but in this embodiment a motor output shaft 526 is not co-linear with a (second) gearbox input shaft 542. Instead, the motor output shaft 526 is directed to the (second) gearbox input shaft 542 with a change in rotational direction therebetween. This change in rotational direction could be implemented with a set of bevel gears 530, which could provide a change in rotational direction of, for example, 45° or 90° (as seen in FIG. 30). Furthermore, this change in rotational direction could be implemented by a gear train other than bevel gears, such as a different type of small gearbox, in which this gear train acts as a "first" gearbox that could provide an additional reduction in the rotational speed between the motor output shaft 526 (as the input to the first gearbox), and the second gearbox input shaft 542 (which would be driven by an output of the second gearbox). It will be understood that the bevel gears 530 are an example of this first gearbox, and as such, the first gearbox as a general concept will also be referred to herein by the reference numeral 530.

With the second gearbox 540 being positioned within the lifter rotor's open central space 584, the second gearbox input shaft 542 extends through a hollow central portion of the second gearbox output shaft 586, in an orientation in which the second gearbox input and output shafts are co-linear (e.g., concentric). In addition, with the second gearbox 540 being physically positioned within the open space 584 formed by the lifter rotor 586, the axis of rotation of the lifter rotor is co-linear with the second gearbox input shaft.

Again referring to FIGS. 26, 27, and 28, a fourth alternative embodiment tool 505 is illustrated, including a working cylinder 570, a piston 572 and a driver 590, a trigger handle 568, a fastener magazine 564, and an exit end 566. During operation of the tool 505, the piston 572 and the driver 590 reciprocate from near the top of the working cylinder 570 (at 505) towards a bumper 560, and this reciprocating travel motion creates the longitudinal movement of the driver 590. In FIG. 28, the magazine 564 is positioned at a slight angle compared to the trigger handle 568, and the motor 520 and the lifter hub 586 are positioned "above" a guide body 550 (in this view). As can be seen in FIG. 28, the motor 520 is not positioned directly "above" the physical guide body 550, yet is at the same elevation (in this view) as the lifter hub 586, which is directly "above"the physical guide body 550.

Referring now to FIG. 29, the motor 520 is illustrated, as well as is the lifter hub 586, which includes a plurality of protrusions 582. It will be understood that the use of two separate gearboxes (see FIG. 30) may provide an advantage of creating a higher overall gear reduction ratio between the motor's output shaft 526 and the output of the second gearbox, if desired by the tool's system designer. And it will be further understood that a change in rotational direction between the motor's output shaft 526 and the second gearbox's input shaft (at 542, for example) is certainly not a requirement for the successful operation of this embodiment 505. In other words, the input and output shafts of the first gearbox may be parallel, or even co-linear, if desired.

Figure 12:
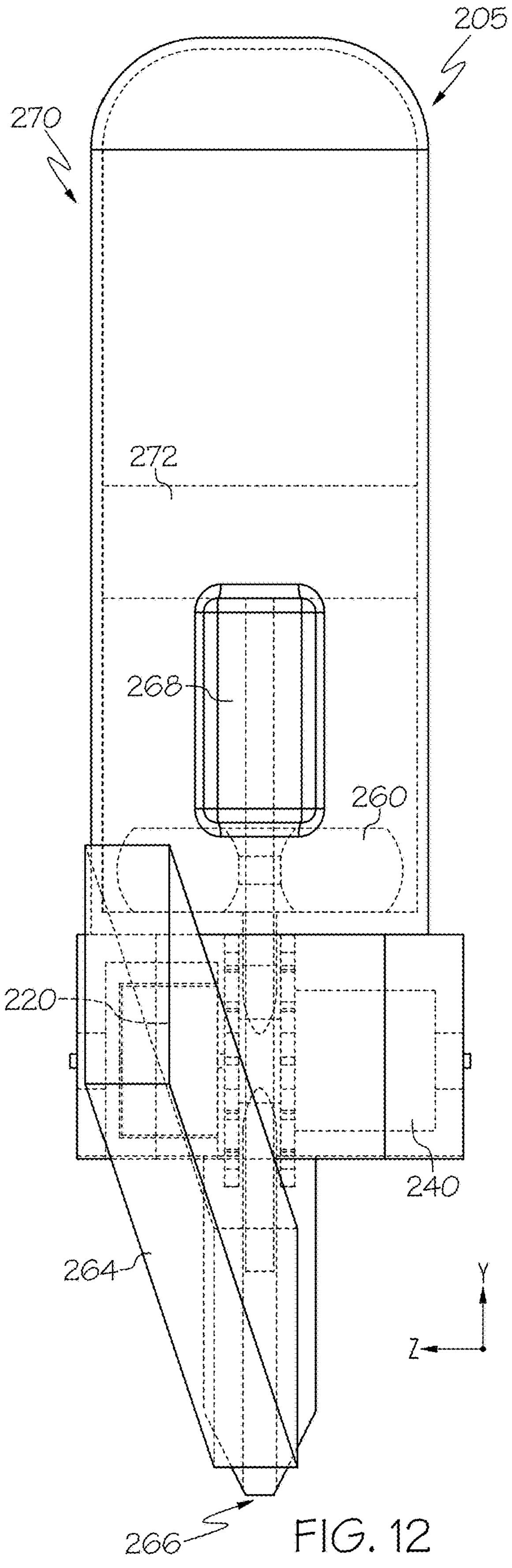
FIG. 12 is a rear, elevational view in partial cut-away of the tool without the tool's outer housing or pressure chamber, and the first alternative lifter subassembly of FIG. 11.

Additional other specific features of the fastener driving tools disclosed herein are as follows: with respect to the Z-axis, the motor 220 is mounted to one side of the lifter 286, and the gearbox 240 is mounted to a second, opposite side of the lifter 286 (see FIG. 13); with respect to the Y-axis, the "at least one motor" 20, 30 is positioned closer to the exit end 66 than is the trigger handle 68 (e.g., see FIG. 8), or motor 220 is positioned closer to the exit end 266 than is the trigger handle 268 (e.g., see FIG. 12). Furthermore, the "at least one motor" 20, 30 is positioned on the opposite side of the longitudinal axis (e.g., the driver track at 90) than where the trigger handle 68 is positioned. Moreover, the gearbox 40 and the lifter 10 are both positioned on the opposite side of the longitudinal axis than where the trigger handle 68 is positioned (e.g., see FIGS. 7-10); or gearbox 240 and lifter 210 are both positioned on the opposite side of the longitudinal axis than where the trigger handle 268 is positioned (e.g., see FIGS. 13-15).

Note that some of the embodiments illustrated herein do not have all of their components included on some of the figures herein, for purposes of clarity. To see examples of such outer housings and other components, especially for earlier designs, the reader is directed to other U.S. patents and applications owned by Senco. Similarly, information about "how" the electronic controller operates to control the functions of the tool is found in other U.S. patents and applications owned by Senco. Moreover, other aspects of the present tool technology may have been present in earlier fastener driving tools sold by the Assignee, Kyocera Senco Industrial Tools, Inc., including information disclosed in previous U.S. patents and published applications. Examples of such publications are patent numbers U.S. Pat. Nos. 6,431,425; 5,927,585; 5,918,788; 5,732,870; 4,986,164; 4,679,719; 8,011,547, 8,267,296, 8,267,297, 8,011,441, 8,387,718, 8,286,722, 8,230,941, 8,602,282, 9,676,088, 10,478,954, 9,993,913, 10,549,412, 10,898,994, 10,821,585 and 8,763,874; also published U.S. patent application No. 2020/0156228, published U.S. patent application No. 2021/0016424, published U.S. patent application No. 2020/0070330, and published U.S. patent application No. 2020/0122308; also U.S. patent application Ser. No. 18/135,249, filed on Apr. 17, 2023; U.S. patent application Ser. No. 18/221,507, filed on Jul. 13, 2023; and U.S. patent application Ser. No. 63/601,412, filed on Nov. 21, 2023. These documents are incorporated by reference herein, in their entirety.

It will be further understood that any type of product described herein that has moving parts, or that performs functions (such as computers with processing circuits and memory circuits), should be considered a "machine," and not merely as some inanimate apparatus. Such "machine" devices should automatically include power tools, printers, electronic locks, and the like, as those example devices each have certain moving parts. Moreover, a computerized device that performs useful functions should also be considered a machine, and such terminology is often used to describe many such devices; for example, a solid-state telephone answering machine may have no moving parts, yet it is commonly called a "machine"because it performs well-known useful functions.

As used herein, the term "proximal" can have a meaning of closely positioning one physical object with a second physical object, such that the two objects are perhaps adjacent to one another, although it is not necessarily required that there be no third object positioned therebetween. In the technology disclosed herein, there may be instances in which a "male locating structure" is to be positioned "proximal" to a "female locating structure." In general, this could mean that the two (male and female) structures are to be physically abutting one another, or this could mean that they are "mated" to one another by way of a particular size and shape that essentially keeps one structure oriented in a predetermined direction and at an X-Y (e.g., horizontal and vertical) position with respect to one another, regardless as to whether the two (male and female) structures actually touch one another along a continuous surface. Or, two structures of any size and shape (whether male, female, or otherwise in shape) may be located somewhat near one another, regardless if they physically abut one another or not; such a relationship could still be termed "proximal." Or, two or more possible locations for a particular point can be specified in relation to a precise attribute of a physical object, such as being "near" or "at" the end of a stick; all of those possible near/at locations could be deemed "proximal" to the end of that stick. Moreover, the term "proximal" can also have a meaning that relates strictly to a single object, in which the single object may have two ends, and the "distal end" is the end that is positioned somewhat farther away from a subject point (or area) of reference, and the "proximal end" is the other end, which would be positioned somewhat closer to that same subject point (or area) of reference.

It will be understood that the various components that are described and/or illustrated herein can be fabricated in various ways, including in multiple parts or as a unitary part for each of these components, without departing from the principles of the technology disclosed herein. For example, a component that is included as a recited element of a claim hereinbelow may be fabricated as a unitary part; or that component may be fabricated as a combined structure of several individual parts that are assembled together. But that "multi-part component" will still fall within the scope of the claimed, recited element for infringement purposes of claim interpretation, even if it appears that the claimed, recited element is described and illustrated herein only as a unitary structure.

All documents cited in the Background and in the Detailed Description are, in relevant part, incorporated herein by reference; the citation of any document is not to be construed as an admission that it is prior art with respect to the technology disclosed herein.

The foregoing description of a preferred embodiment has been presented for purposes of illustration and description. It is not intended to be exhaustive or to limit the technology disclosed herein to the precise form disclosed, and the technology disclosed herein may be further modified within the spirit and scope of this disclosure. Any examples described or illustrated herein are intended as non-limiting examples, and many modifications or variations of the examples, or of the preferred embodiment(s), are possible in light of the above teachings, without departing from the spirit and scope of the technology disclosed herein. The embodiment(s) was chosen and described in order to illustrate the principles of the technology disclosed herein and its practical application to thereby enable one of ordinary skill in the art to utilize the technology disclosed herein in various embodiments and with various modifications as are suited to particular uses contemplated. This application is therefore intended to cover any variations, uses, or adaptations of the technology disclosed herein using its general principles. Further, this application is intended to cover such departures from the present disclosure as come within known or customary practice in the art to which this technology disclosed herein pertains and which fall within the limits of the appended claims.

What is claimed is:

1. A fastener driving tool, comprising:

a main body, which includes (a) a working cylinder that comprises a cylindrical sleeve and a movable piston therewithin; and (b) a storage chamber that is in fluidic communication with the working cylinder at least during a driving portion of an operating cycle of the fastener driving tool, the storage chamber containing a pressurized gas;

a driver that is in mechanical communication with the movable piston, the driver having a direction of movement along a longitudinal axis of the fastener driving tool, the driver including a plurality of spaced-apart extensions;

the pressurized gas causing the movable piston to move along the longitudinal axis of the fastener driving tool during the driving portion of the operating cycle of the fastener driving tool, wherein the pressurized gas is not vented to atmosphere during each operating cycle of the fastener driving tool, but instead the pressurized gas is re-used for a plurality of operating cycles;

a trigger handle that extends from the main body of the fastener driving tool;

a gearbox that includes a gearbox input shaft that is rotatable, and a gearbox output shaft that is rotatable, the gearbox creating a ratio change such that the gearbox input shaft and the gearbox output shaft rotate at different rotational speeds;

a lifter that includes a lifter rotor that is rotatable, and that is in mechanical communication with the gearbox output shaft, the lifter rotor including at least one protrusion at an outer surface of the lifter rotor, the at least one protrusion being sized and shaped to mechanically engage with the plurality of spaced-apart extensions of the driver at least during a lifting portion of the operating cycle of the fastener driving tool; and at least one motor that includes a motor shaft, the motor shaft being in mechanical communication with the gearbox input shaft;

wherein, the fastener driving tool having:

an X-axis extending in a direction that is substantially perpendicular to the longitudinal axis of the fastener driving tool;

a Y-axis extending in a direction that is substantially parallel to the longitudinal axis of the fastener driving tool;

a Z-axis extending in a direction that is substantially parallel to an axis of rotation of the motor shaft of the at least one motor;

wherein:

the X-axis and the Y-axis are perpendicular to one another, the X-axis and the Z-axis are perpendicular to one another, and the Y-axis and the Z-axis are perpendicular to one another;

the trigger handle lies substantially in a plane defined by the X-axis and the Y-axis;

an axis of rotation of the gearbox output shaft is substantially parallel to the Z-axis; and an axis of rotation of the lifter rotor is substantially parallel to the Z-axis.

2. The fastener driving tool of claim 1, wherein:

with respect to the X-axis, the at least one motor is positioned on a first side of the driver, and the trigger handle is positioned on a second, opposite side of the driver.

3. The fastener driving tool of claim 1, wherein:

with respect to the Z-axis, the at least one motor is mounted to one side of the lifter, and the gearbox is mounted to a second, opposite side of the lifter.

4. The fastener driving tool of claim 1, wherein:

the direction of movement of the driver follows a driver track that is along the longitudinal axis of the fastener driving tool, and has an exit end where a fastener is driven from the driver track; and with respect to the Y-axis, the at least one motor is positioned closer to the exit end than is the trigger handle.

5. The fastener driving tool of claim 1, wherein:

the at least one motor is positioned on the opposite side of the longitudinal axis than where the trigger handle is positioned.

6. The fastener driving tool of claim 5, wherein:

the gearbox and the lifter are both positioned on the opposite side of the longitudinal axis than where the trigger handle is positioned.

7. A mechanical drive assembly for a fastener driving tool, the drive assembly comprising:

a gearbox, the gearbox including a gearbox input shaft that is rotatable, and a gearbox output shaft that is rotatable, the gearbox creating a ratio change such that the gearbox input shaft and the gearbox output shaft rotate at different rotational speeds;

a driver that is sized and shaped to contact a fastener and to drive a fastener from the fastener driving tool along a longitudinal axis of movement of the driver, during a driving portion of an operating cycle of the fastener driving tool, the driver including a plurality of spaced-apart extensions; and a lifter which includes a lifter rotor that is rotatable, and that is in mechanical communication with the gearbox output shaft, the lifter rotor including at least one protrusion at an outer surface of the lifter rotor, the at least one protrusion being sized and shaped to mechanically engage with the plurality of spaced-apart extensions of the driver at least during a lifting portion of the operating cycle of the fastener driving tool; and a motor that is mounted proximal to a first side of the lifter;

wherein:

the gearbox is mounted proximal to a second, opposite side of the lifter; and the gearbox input shaft extends into, and is shared by, the motor, such that if the motor is activated, the motor then causes the gearbox input shaft to rotate.

8. The mechanical drive assembly of claim 7, wherein: the axis of rotation of the gearbox input shaft is in a transverse direction with respect to the longitudinal axis of movement of the driver.

9. The mechanical drive assembly of claim 7, wherein: the physical position of the gearbox is such that an axis of rotation of the lifter rotor is parallel to the gearbox input shaft.

* * * * *